United States Patent
Friesen et al.

(10) Patent No.: US 12,480,289 B2
(45) Date of Patent: Nov. 25, 2025

(54) THERMAL DESICCANT SYSTEMS AND METHODS FOR GENERATING LIQUID WATER

(71) Applicant: Source Global, PBC, Scottsdale, AZ (US)

(72) Inventors: Cody Friesen, Scottsdale, AZ (US); Michael Robinson, Scottsdale, AZ (US); Grant Friesen, Scottsdale, AZ (US); Kamil Salloum, Scottsdale, AZ (US); Kimberly McGuinness, Scottsdale, AZ (US); Luis Mejiaortega, Scottsdale, AZ (US)

(73) Assignee: SOURCE Global, PBC, Scottsdale, AZ (US)

( * ) Notice: Subject to any disclaimer, the term of this patent is extended or adjusted under 35 U.S.C. 154(b) by 49 days.

(21) Appl. No.: 18/513,851

(22) Filed: Nov. 20, 2023

(65) Prior Publication Data

US 2024/0159025 A1    May 16, 2024

Related U.S. Application Data

(63) Continuation of application No. 17/859,971, filed on Jul. 7, 2022, now Pat. No. 11,846,092, which is a
(Continued)

(51) Int. Cl.
  B01D 53/04     (2006.01)
  B01D 53/06     (2006.01)
  (Continued)

(52) U.S. Cl.
  CPC ............ *E03B 3/28* (2013.01); *B01D 53/0438* (2013.01); *B01D 53/0454* (2013.01);
  (Continued)

(58) Field of Classification Search
  CPC ... E03B 3/28; B01D 53/0438; B01D 53/0454; B01D 53/06; B01D 53/261;
  (Continued)

(56) References Cited

U.S. PATENT DOCUMENTS

| | | |
|---|---|---|
| 1,816,592 A | 7/1931 | Knapen |
| 2,138,689 A | 11/1938 | Altenkirch |

(Continued)

FOREIGN PATENT DOCUMENTS

| | | |
|---|---|---|
| CH | 703472 | 1/2012 |
| CN | 1592831 | 3/2005 |

(Continued)

OTHER PUBLICATIONS

Non-Final Office Action dated Jan. 17, 2020 in U.S. Appl. No. 15/528,366.
(Continued)

*Primary Examiner* — Frank M Lawrence, Jr.
(74) *Attorney, Agent, or Firm* — Fish & Richardson P.C.

(57) ABSTRACT

Systems for generation of liquid water are provided. In embodiments, the systems comprise a thermal desiccant unit comprising a porous hygroscopic material located within a housing including a fluid inlet and a fluid outlet, a working fluid that accumulates heat and water vapor upon flowing from fluid inlet of the housing, through the porous hygroscopic material, and to the fluid outlet of the housing, a condenser comprising a fluid inlet and a fluid outlet for condensing water vapor from the working fluid; an enthalpy exchange unit operatively coupled between the thermal desiccant unit and the condenser, wherein the enthalpy exchange unit transfers enthalpy between the working fluid output from the thermal desiccant unit and the working fluid input to the thermal desiccant unit, and, wherein the enthalpy exchange unit transfers enthalpy between the work-
(Continued)

ing fluid output from the condenser and the working fluid input to the condenser.

18 Claims, 14 Drawing Sheets

Related U.S. Application Data continuation of application No. 16/855,965, filed on Apr. 22, 2020, now Pat. No. 11,414,843.

(60) Provisional application No. 62/939,478, filed on Nov. 22, 2019, provisional application No. 62/837,115, filed on Apr. 22, 2019.

(51) Int. Cl.
   *B01D 53/26* (2006.01)
   *E03B 3/28* (2006.01)
   *F24F 3/14* (2006.01)

(52) U.S. Cl.
   CPC ........... *B01D 53/06* (2013.01); *B01D 53/261* (2013.01); *B01D 53/265* (2013.01); *F24F 3/1429* (2013.01); *B01D 2257/80* (2013.01)

(58) Field of Classification Search
   CPC .............. B01D 53/265; B01D 2257/80; B01D 2253/102; B01D 2253/106; B01D 2253/108; B01D 2259/40088; B01D 2259/40098; B01D 2259/414; B01D 2259/65; B01D 53/28; B01D 53/04; F24F 3/1429; F24F 3/1423; Y02A 20/00
   USPC ...... 95/1, 4, 10, 113, 117–123; 96/109, 111, 96/112, 121, 125
   See application file for complete search history.

(56) References Cited

U.S. PATENT DOCUMENTS

| | | |
|---|---|---|
| 2,284,914 A | 6/1942 | Miller |
| 2,462,952 A | 3/1949 | Dunkak |
| 2,700,537 A | 1/1955 | Pennington |
| 2,761,292 A | 9/1956 | Coanda et al. |
| 3,102,532 A | 9/1963 | Shoemaker |
| 3,400,515 A | 9/1968 | Ackerman |
| 3,676,321 A | 7/1972 | Cummings et al. |
| 3,683,591 A | 8/1972 | Glav |
| 3,726,778 A | 4/1973 | Seltzer et al. |
| 3,740,959 A | 6/1973 | Foss |
| 3,844,737 A | 10/1974 | Macriss et al. |
| 3,889,532 A | 6/1975 | Pilie et al. |
| 3,889,742 A | 6/1975 | Rush et al. |
| 3,917,931 A | 11/1975 | Sweeney |
| 4,054,124 A | 10/1977 | Knoos |
| 4,080,186 A | 3/1978 | Ockert |
| 4,095,997 A | 6/1978 | Griffiths |
| 4,117,831 A | 10/1978 | Bansal et al. |
| 4,134,743 A | 1/1979 | Macriss et al. |
| 4,136,672 A | 1/1979 | Hallanger |
| 4,146,372 A | 3/1979 | Groth et al. |
| 4,169,459 A | 10/1979 | Ehrlich |
| 4,185,969 A | 1/1980 | Bulang |
| 4,201,195 A | 5/1980 | Sakhuja |
| 4,219,341 A | 8/1980 | Hussmann |
| 4,222,244 A | 9/1980 | Meckler |
| 4,234,037 A | 11/1980 | Rogers et al. |
| 4,242,112 A | 12/1980 | Jebens |
| 4,285,702 A | 8/1981 | Michel et al. |
| 4,304,577 A | 12/1981 | Ito et al. |
| 4,315,599 A | 2/1982 | Biancardi |
| 4,334,524 A | 6/1982 | McCullough |
| 4,342,569 A | 8/1982 | Hussmann |
| 4,345,917 A | 8/1982 | Hussmann |
| 4,351,651 A | 9/1982 | Courneya |
| 4,374,655 A | 2/1983 | Grodzka et al. |
| 4,377,398 A | 3/1983 | Bennett |
| 4,398,927 A | 8/1983 | Asher et al. |
| 4,405,343 A | 9/1983 | Othmer |
| 4,433,552 A | 2/1984 | Smith |
| 4,478,210 A | 10/1984 | Sieradski |
| 4,722,192 A | 2/1988 | Koblitz et al. |
| 4,726,817 A | 2/1988 | Roger |
| 4,926,618 A | 5/1990 | Ratliff |
| 5,058,388 A | 10/1991 | Shaw et al. |
| 5,123,777 A | 6/1992 | Tadros |
| 5,148,374 A | 9/1992 | Coellner |
| 5,213,773 A | 5/1993 | Burris |
| 5,275,643 A | 1/1994 | Usui |
| 5,470,484 A | 11/1995 | McNeel |
| 5,579,647 A | 12/1996 | Calton et al. |
| 5,701,749 A | 12/1997 | Zakryk |
| 5,718,122 A | 2/1998 | Maeda |
| 5,729,981 A | 3/1998 | Markus et al. |
| 5,758,508 A | 6/1998 | Belding et al. |
| 5,758,511 A | 6/1998 | Yoho et al. |
| 5,826,434 A | 10/1998 | Belding et al. |
| 5,846,296 A | 12/1998 | Krumsvik |
| 5,873,256 A | 2/1999 | Denniston |
| 5,989,313 A | 11/1999 | Mize |
| 6,029,467 A | 2/2000 | Moratalla |
| 6,156,102 A | 12/2000 | Contad et al. |
| 6,199,388 B1 | 3/2001 | Fischer, Jr. |
| 6,336,957 B1 | 1/2002 | Tsymerman |
| 6,447,583 B1 | 9/2002 | Thelen et al. |
| 6,490,879 B1 | 12/2002 | Lloyd et al. |
| 6,511,525 B2 | 1/2003 | Spletzer et al. |
| 6,513,339 B1 | 2/2003 | Kopko |
| 6,531,016 B1 | 3/2003 | Weber |
| 6,557,365 B2 | 5/2003 | Dinnage et al. |
| 6,574,979 B2 | 6/2003 | Faqih |
| 6,644,060 B1 | 11/2003 | Dagan |
| 6,828,499 B2 * | 12/2004 | Max ................... B01D 5/0042 136/246 |
| 6,869,464 B2 | 3/2005 | Klemic |
| 6,945,063 B2 | 9/2005 | Max |
| 6,957,543 B1 | 10/2005 | Reznik |
| 7,017,356 B2 | 3/2006 | Moffitt |
| 7,043,934 B2 | 5/2006 | Radermacher et al. |
| 7,178,355 B2 | 2/2007 | Moffitt |
| 7,251,945 B2 | 8/2007 | Tongue |
| 7,305,849 B2 | 12/2007 | Loffler et al. |
| 7,306,654 B2 | 12/2007 | King et al. |
| 7,478,535 B2 | 1/2009 | Turner, Jr. et al. |
| 7,740,765 B2 | 6/2010 | Mitchell |
| 7,866,176 B2 | 1/2011 | Vetrovec et al. |
| 7,905,097 B1 | 3/2011 | Fort |
| 7,926,481 B2 | 4/2011 | Edwards et al. |
| 8,075,652 B2 | 12/2011 | Melikyan |
| 8,118,912 B2 | 2/2012 | Rodriguez et al. |
| 8,187,368 B2 | 5/2012 | Shih |
| 8,196,422 B2 | 6/2012 | Ritchey |
| 8,328,904 B2 | 12/2012 | Griffiths et al. |
| 8,425,660 B2 | 4/2013 | Ike et al. |
| 8,506,675 B2 | 8/2013 | Ellsworth |
| 8,844,299 B2 | 9/2014 | Ferreira et al. |
| 8,876,956 B2 | 11/2014 | Ball et al. |
| 9,289,718 B2 | 3/2016 | Dahlback |
| 10,357,739 B2 | 7/2019 | Friesen et al. |
| 10,469,028 B2 | 11/2019 | Friesen et al. |
| 10,632,416 B2 | 4/2020 | Friesen et al. |
| 10,718,101 B2 | 7/2020 | Panda et al. |
| 10,835,861 B2 | 11/2020 | Friesen et al. |
| 11,159,123 B2 | 10/2021 | Friesen et al. |
| 11,160,223 B2 | 11/2021 | Friesen et al. |
| 11,266,944 B2 | 3/2022 | Friesen et al. |
| 11,281,997 B2 | 3/2022 | Friesen et al. |
| 11,285,435 B2 | 3/2022 | Friesen et al. |
| 11,359,356 B2 | 6/2022 | Friesen et al. |
| 11,384,517 B2 | 7/2022 | Friesen et al. |
| 11,414,843 B2 | 8/2022 | Friesen et al. |
| 11,447,407 B2 | 9/2022 | Friesen et al. |
| 11,555,421 B2 | 1/2023 | Friesen et al. |

(56) References Cited

U.S. PATENT DOCUMENTS

| | | |
|---|---|---|
| 11,814,820 B2 | 11/2023 | Friesen et al. |
| 11,846,092 B2 | 12/2023 | Friesen et al. |
| 11,858,835 B2 | 1/2024 | Friesen et al. |
| 11,859,372 B2 | 1/2024 | Friesen et al. |
| 11,892,192 B1* | 2/2024 | Dorson .............. B01D 53/0454 |
| 11,900,226 B2 | 2/2024 | Friesen et al. |
| 11,905,687 B2 | 2/2024 | Friesen et al. |
| 11,913,903 B1 | 2/2024 | Friesen et al. |
| 11,975,289 B2 | 5/2024 | Friesen et al. |
| 12,021,488 B2 | 6/2024 | Friesen et al. |
| 12,060,813 B2 | 8/2024 | Friesen et al. |
| 2001/0003249 A1 | 6/2001 | Stormbom |
| 2002/0046569 A1 | 4/2002 | Faqih |
| 2002/0130091 A1 | 9/2002 | Ekberg et al. |
| 2003/0091881 A1 | 5/2003 | Eisler |
| 2003/0101161 A1 | 5/2003 | Ferguson et al. |
| 2004/0000165 A1 | 1/2004 | Max |
| 2004/0055309 A1 | 3/2004 | Bellows et al. |
| 2005/0044862 A1 | 3/2005 | Vetrovec et al. |
| 2005/0061311 A1 | 3/2005 | Christensen |
| 2005/0084415 A1 | 4/2005 | McVey et al. |
| 2005/0204914 A1 | 9/2005 | Boutall |
| 2005/0249631 A1 | 11/2005 | Schulz et al. |
| 2005/0284167 A1 | 12/2005 | Morgan |
| 2006/0017740 A1 | 1/2006 | Coleman |
| 2006/0032493 A1 | 2/2006 | Ritchey |
| 2006/0060475 A1 | 3/2006 | Applegate et al. |
| 2006/0112709 A1 | 6/2006 | Boyle |
| 2006/0130654 A1 | 6/2006 | King et al. |
| 2006/0288709 A1 | 12/2006 | Reidy |
| 2007/0028769 A1 | 2/2007 | Eplee et al. |
| 2007/0101862 A1 | 5/2007 | Tongue |
| 2007/0150424 A1 | 6/2007 | Igelnik |
| 2007/0274858 A1 | 11/2007 | Childers et al. |
| 2007/0295021 A1 | 12/2007 | Tyls et al. |
| 2008/0022694 A1 | 1/2008 | Anderson et al. |
| 2008/0060316 A1 | 3/2008 | Fukuda |
| 2008/0135495 A1 | 6/2008 | Sher |
| 2008/0168789 A1 | 7/2008 | Jones |
| 2008/0202944 A1 | 8/2008 | Santoli et al. |
| 2008/0224652 A1 | 9/2008 | Zhu et al. |
| 2008/0245092 A1 | 10/2008 | Forsberg et al. |
| 2008/0245992 A1 | 10/2008 | Vivanco |
| 2008/0289352 A1 | 11/2008 | Parent |
| 2008/0295695 A1 | 12/2008 | Takeuchi |
| 2009/0025711 A1 | 1/2009 | Edwards et al. |
| 2009/0093916 A1 | 4/2009 | Parsonnet et al. |
| 2009/0173376 A1 | 7/2009 | Spencer et al. |
| 2009/0211276 A1 | 8/2009 | Forkosh |
| 2009/0223236 A1 | 9/2009 | Call et al. |
| 2009/0223514 A1 | 9/2009 | Smith et al. |
| 2009/0283464 A1 | 11/2009 | Oe et al. |
| 2010/0083673 A1 | 4/2010 | Meritt |
| 2010/0116322 A1 | 5/2010 | Helbig et al. |
| 2010/0170499 A1 | 7/2010 | Bar |
| 2010/0192605 A1 | 8/2010 | Fang et al. |
| 2010/0212348 A1 | 8/2010 | Oh |
| 2010/0242507 A1 | 9/2010 | Meckler |
| 2010/0275629 A1 | 11/2010 | Erickson |
| 2010/0275775 A1 | 11/2010 | Griffiths et al. |
| 2010/0294672 A1 | 11/2010 | Gahr et al. |
| 2010/0300868 A1 | 12/2010 | Pirone |
| 2011/0048039 A1 | 3/2011 | Kohavi et al. |
| 2011/0056220 A1 | 3/2011 | Caggiano |
| 2011/0083458 A1 | 4/2011 | Takakura et al. |
| 2011/0132027 A1 | 6/2011 | Gommed et al. |
| 2011/0232485 A1 | 9/2011 | Ellsworth |
| 2011/0247353 A1 | 10/2011 | Metz |
| 2011/0296858 A1 | 12/2011 | Caggiano |
| 2012/0006193 A1 | 1/2012 | Roychoudhury |
| 2012/0125020 A1 | 5/2012 | Vandermeulen et al. |
| 2012/0144828 A1 | 6/2012 | Lazaris |
| 2012/0227582 A1 | 9/2012 | Wamstad et al. |
| 2012/0264600 A1 | 10/2012 | Tso et al. |
| 2012/0323098 A1 | 12/2012 | Moein et al. |
| 2013/0042642 A1 | 2/2013 | Ferreira et al. |
| 2013/0140777 A1 | 6/2013 | Erb |
| 2013/0227879 A1 | 9/2013 | Lehky |
| 2013/0269522 A1 | 10/2013 | Valve |
| 2013/0312451 A1 | 11/2013 | Max |
| 2013/0318790 A1 | 12/2013 | Becze et al. |
| 2013/0319022 A1 | 12/2013 | Becze et al. |
| 2013/0319032 A1* | 12/2013 | Ball ...................... F25B 37/00 62/271 |
| 2014/0034475 A1 | 2/2014 | Kamen et al. |
| 2014/0053580 A1 | 2/2014 | Ferreira et al. |
| 2014/0110273 A1 | 4/2014 | Bar-or et al. |
| 2014/0138236 A1 | 5/2014 | White |
| 2014/0157985 A1 | 6/2014 | Scovazzo et al. |
| 2014/0173769 A1 | 6/2014 | Leyns et al. |
| 2014/0259920 A1 | 9/2014 | Wilson |
| 2014/0260389 A1 | 9/2014 | Sistla |
| 2014/0317029 A1 | 10/2014 | Matsuoka et al. |
| 2015/0033774 A1 | 2/2015 | Ferreira et al. |
| 2015/0107281 A1 | 4/2015 | West |
| 2015/0136666 A1 | 5/2015 | Zamir et al. |
| 2015/0194926 A1 | 7/2015 | Bushong, Jr. |
| 2015/0226697 A1 | 8/2015 | Morgan et al. |
| 2016/0073589 A1 | 3/2016 | McNamara |
| 2016/0118936 A1 | 4/2016 | Williams |
| 2016/0131401 A1 | 5/2016 | Otanicar et al. |
| 2016/0162456 A1 | 6/2016 | Munro et al. |
| 2016/0187287 A1 | 6/2016 | Tajiri et al. |
| 2016/0197364 A1 | 7/2016 | Rama |
| 2016/0209346 A1 | 7/2016 | Brondum et al. |
| 2016/0229706 A1* | 8/2016 | Ackerman ................ C02F 1/16 |
| 2016/0244951 A1 | 8/2016 | Yui |
| 2016/0333553 A1 | 11/2016 | Dorfman |
| 2017/0013810 A1 | 1/2017 | Grabell |
| 2017/0024641 A1 | 1/2017 | Wierzynski |
| 2017/0203974 A1 | 7/2017 | Riedl et al. |
| 2017/0241110 A1 | 8/2017 | West |
| 2017/0247862 A1 | 8/2017 | Giacomini |
| 2017/0294876 A1 | 10/2017 | Friesen et al. |
| 2017/0323221 A1 | 11/2017 | Chaudhuri et al. |
| 2017/0354920 A1 | 12/2017 | Friesen et al. |
| 2017/0371544 A1 | 12/2017 | Choi et al. |
| 2018/0029903 A1 | 2/2018 | Ng |
| 2018/0043295 A1 | 2/2018 | Friesen et al. |
| 2018/0209123 A1 | 7/2018 | Bahrami et al. |
| 2018/0332830 A1 | 11/2018 | Gordon |
| 2018/0369713 A1 | 12/2018 | Dorfman |
| 2019/0025273 A1 | 1/2019 | Brondum |
| 2019/0039960 A1 | 2/2019 | Deo et al. |
| 2019/0063786 A1 | 2/2019 | Bowman |
| 2019/0102695 A1 | 4/2019 | Biswas et al. |
| 2019/0171967 A1 | 6/2019 | Friesen et al. |
| 2019/0254243 A1 | 8/2019 | Friesen et al. |
| 2019/0336907 A1 | 11/2019 | Friesen et al. |
| 2019/0344214 A1 | 11/2019 | Friesen et al. |
| 2019/0372520 A1 | 12/2019 | Friesen et al. |
| 2020/0009497 A1* | 1/2020 | Matuska ............... B01D 53/261 |
| 2020/0049628 A1 | 2/2020 | Fukuzawa et al. |
| 2020/0055753 A1 | 2/2020 | Minor et al. |
| 2020/0108344 A1 | 4/2020 | Vollmer et al. |
| 2020/0122083 A1 | 4/2020 | Friesen et al. |
| 2020/0124566 A1 | 4/2020 | Johnson et al. |
| 2020/0140299 A1 | 5/2020 | Friesen et al. |
| 2020/0209190 A1 | 7/2020 | Johnson et al. |
| 2020/0269153 A1* | 8/2020 | Turner, Jr. ........... B01D 5/0042 |
| 2020/0269184 A1 | 8/2020 | Friesen et al. |
| 2020/0283997 A1 | 9/2020 | Salloum et al. |
| 2020/0286997 A1 | 9/2020 | Wu et al. |
| 2020/0300128 A1 | 9/2020 | Friesen et al. |
| 2020/0332498 A1 | 10/2020 | Friesen et al. |
| 2020/0361965 A1 | 11/2020 | Yaghi et al. |
| 2021/0062478 A1 | 3/2021 | Friesen et al. |
| 2021/0192368 A1 | 6/2021 | Schall |
| 2021/0300804 A1 | 9/2021 | Broga et al. |
| 2021/0305935 A1 | 9/2021 | Friesen et al. |
| 2022/0039341 A1 | 2/2022 | Friesen et al. |
| 2022/0127172 A1 | 4/2022 | Friesen et al. |
| 2022/0136270 A1 | 5/2022 | Gamboa et al. |
| 2022/0156648 A1 | 5/2022 | Friesen et al. |

(56) References Cited

U.S. PATENT DOCUMENTS

| | | |
|---|---|---|
| 2022/0176314 A1 | 6/2022 | Friesen et al. |
| 2022/0228351 A1 | 7/2022 | Friesen et al. |
| 2022/0259838 A1 | 8/2022 | Friesen et al. |
| 2022/0274048 A1 | 9/2022 | Friesen et al. |
| 2022/0307240 A1 | 9/2022 | Friesen et al. |
| 2022/0316192 A1 | 10/2022 | Friesen et al. |
| 2022/0341134 A1 | 10/2022 | Friesen et al. |
| 2022/0411297 A1 | 12/2022 | Friesen et al. |
| 2023/0014032 A1 | 1/2023 | Friesen et al. |
| 2023/0078132 A1 | 3/2023 | Friesen et al. |
| 2023/0113840 A1 | 4/2023 | Friesen et al. |
| 2023/0130872 A1 | 4/2023 | Friesen et al. |
| 2023/0241551 A1 | 8/2023 | Friesen et al. |
| 2023/0381710 A1* | 11/2023 | Balakrishnan ............ E03B 3/28 |
| 2023/0390696 A1 | 12/2023 | Friesen et al. |
| 2024/0159025 A1 | 5/2024 | Friesen et al. |

FOREIGN PATENT DOCUMENTS

| | | |
|---|---|---|
| CN | 101278164 | 3/2005 |
| CN | 1774401 | 5/2006 |
| CN | 101589282 | 11/2009 |
| CN | 102042645 | 5/2011 |
| CN | 102297503 | 12/2011 |
| CN | 102422089 | 4/2012 |
| CN | 102441320 | 5/2012 |
| CN | 102733451 | 10/2012 |
| CN | 202850099 | 4/2013 |
| CN | 103889892 | 6/2014 |
| CN | 203777907 | 8/2014 |
| CN | 104420501 | 3/2015 |
| CN | 104813107 | 7/2015 |
| CN | 204510348 U | 7/2015 |
| CN | 105531547 | 4/2016 |
| CN | 105910190 | 8/2016 |
| CN | 107278705 | 10/2017 |
| CN | 107447811 | 12/2017 |
| DE | 4215839 | 11/1993 |
| EP | 1139554 | 10/2001 |
| EP | 2305362 | 4/2011 |
| EP | 2326890 | 6/2011 |
| FR | 2813087 | 2/2002 |
| GB | 2237387 | 5/1991 |
| JP | H06142434 | 5/1994 |
| JP | H09-285412 | 11/1997 |
| JP | 2002-126441 | 5/2002 |
| JP | 2003-148786 | 5/2003 |
| JP | 2004-239541 | 8/2004 |
| JP | 3850498 | 11/2006 |
| JP | 2012101169 | 5/2012 |
| KR | 20000003525 | 2/2000 |
| WO | 1999007951 | 2/1999 |
| WO | 2006129200 | 12/2006 |
| WO | 2007041804 | 4/2007 |
| WO | 2007051886 | 5/2007 |
| WO | 2008018071 | 2/2008 |
| WO | 2009043413 | 4/2009 |
| WO | 2011150081 | 12/2011 |
| WO | 2012009024 | 1/2012 |
| WO | 2012128619 | 9/2012 |
| WO | 2012162760 | 12/2012 |
| WO | 2013026126 | 2/2013 |
| WO | 2013182911 | 12/2013 |
| WO | 2014085860 | 6/2014 |
| WO | 2015054435 | 4/2015 |
| WO | 2015197788 | 12/2015 |
| WO | 2016053162 | 4/2016 |
| WO | 2016081863 | 5/2016 |
| WO | 2016138075 | 9/2016 |
| WO | 2016187709 | 12/2016 |
| WO | 2017177143 | 10/2017 |
| WO | 2017201405 | 11/2017 |
| WO | 2018013161 | 1/2018 |
| WO | 2018200388 | 1/2018 |
| WO | 2019014599 | 1/2019 |
| WO | 2019050861 | 3/2019 |
| WO | 2019050866 | 3/2019 |
| WO | 2019071202 | 4/2019 |
| WO | 2019113354 | 6/2019 |
| WO | 2019161339 | 8/2019 |
| WO | 2019217974 | 11/2019 |
| WO | 2020082038 | 4/2020 |
| WO | 2020086621 | 4/2020 |
| WO | 2020219604 | 4/2020 |
| WO | 2021154739 | 8/2021 |
| WO | 2021181097 | 9/2021 |
| WO | 2022093999 | 5/2022 |
| WO | 2023059834 | 4/2023 |
| WO | 2023183291 | 9/2023 |
| WO | 2024177942 | 8/2024 |

OTHER PUBLICATIONS

Final Office Action dated Apr. 27, 2020 in U.S. Appl. No. 15/528,366.
Notice of Allowance dated Jun. 19, 2020 in U.S. Appl. No. 15/528,366.
Notice of Allowance dated Jun. 3, 2019 in U.S. Appl. No. 15/600,046.
Non-Final Office Action dated Feb. 5, 2019 in U.S. Appl. No. 15/482,104.
Notice of Allowance dated Jun. 27, 2019 in U.S. Appl. No. 15/482,104.
Non-Final Office Action dated Jun. 1, 2020 in U.S. Appl. No. 16/167,295.
Final Office Action dated Apr. 13, 2021 in U.S. Appl. No. 16/167,295.
Non-Final Office Action dated Apr. 30, 2021 in U.S. Appl. No. 16/278,608.
Non-Final Office Action dated Jul. 20, 2021 in U.S. Appl. No. 16/211,896.
Notice of Allowance dated Nov. 10, 2021 in U.S. Appl. No. 16/211,896.
Non-Final Office Action dated May 11, 2022 in U.S. Appl. No. 16/411,048.
Notice of Allowance dated Oct. 20, 2022 in U.S. Appl. No. 16/411,048.
Non-Final Office Action dated Aug. 9, 2019 in U.S. Appl. No. 16/517,435.
Notice of Allowance dated Jan. 31, 2020 in U.S. Appl. No. 16/517,435.
Non-Final Office Action dated Jul. 26, 2021 in U.S. Appl. No. 16/630,824.
Final Office Action dated Jan. 11, 2022 in U.S. Appl. No. 16/630,824.
Non-Final Office Action dated Mar. 2, 2022 in U.S. Appl. No. 16/630,824.
Notice of Allowance dated Aug. 3, 2022 in U.S. Appl. No. 16/630,824.
Notice of Allowance dated Feb. 4, 2022 in U.S. Appl. No. 16/644,465.
Notice of Allowance dated Mar. 7, 2022 in U.S. Appl. No. 16/644,487.
Non-Final Office Action dated Aug. 24, 2021 in U.S. Appl. No. 16/657,935.
Non-Final Office Action dated Apr. 12, 2022 in U.S. Appl. No. 16/753,560.
Notice of Allowance dated Sep. 14, 2022 in U.S. Appl. No. 16/753,560.
Non-Final Office Action dated May 15, 2020 in U.S. Appl. No. 16/791,895.
Final Office Action dated Oct. 15, 2020 in U.S. Appl. No. 16/791,895.
Non-Final Office Action dated Jun. 8, 2021 in U.S. Appl. No. 16/791,895.
Final Office Action dated Dec. 20, 2021 in U.S. Appl. No. 16/791,895.
Non Final Office Action dated Jun. 24, 2022 in U.S. Appl. No. 16/791,895.
Notice of Allowance dated Oct. 20, 2021 in U.S. Appl. No. 16/820,587.
Non-Final Office Action dated May 6, 2022 in U.S. Appl. No. 16/855,965.
Non-Final Office Action dated Sep. 15, 2022 in U.S. Appl. No. 17/081,898.
Notice of Allowance dated Sep. 15, 2022 in U.S. Appl. No. 17/081,898.

(56) References Cited

OTHER PUBLICATIONS

Non-Final Office Action dated dated Aug. 28, 2023 in U.S. Appl. No. 17/346,023.
Notice of Allowance dated Feb. 21, 2024 in U.S. Appl. No. 17/346,023.
Notice of Allowance dated Jul. 7, 2023 in U.S. Appl. No. 17/578,854.
Non-Final Office Action dated Jun. 21, 2023 in U.S. Appl. No. 17/666,442.
Notice of Allowance dated Oct. 6, 2023 in U.S. Appl. No. 17/666,442.
Non-Final Office Action dated Sep. 27, 2023 in U.S. Appl. No. 17/667,435.
Notice of Allowance dated Jan. 5, 2024 in U.S. Appl. No. 17/667,435.
Non-Final Office Action dated Jun. 7, 2023 in U.S. Appl. No. 17/677,817.
Notice of Allowance dated Dec. 6, 2023 in U.S. Appl. No. 17/677,817.
Non-Final Office Action date Jul. 9, 2024 in U.S. Appl. No. 17/736,027.
Notice of Allowance dated Aug. 31, 2023 in U.S. Appl. No. 17/832,977.
Non-Final Office Action dated Apr. 10, 2023 in U.S. Appl. No. 17/859,971.
Notice of Allowance dated Aug. 11, 2023 in U.S. Appl. No. 17/859,971.
Non-Final Office Action dated Mar. 2, 2023 in U.S. Appl. No. 17/899,416.
Notice of Allowance dated Sep. 1, 2023 in U.S. Appl. No. 17/899,416.
Non-Final Office Action dated Mar. 29, 2023 in U.S. Appl. No. 17/832,977.
Notice of Allowance dated Oct. 10, 2023 in U.S. Appl. No. 17/711,459.
Non-Final Office Action dated Jan. 17, 2024 in U.S. Appl. No. 17/508,854.
Non-Final Office Action dated Jan. 4, 2024 in U.S. Appl. No. 18/085,456.
Notice of Allowance dated May 2, 2024 in U.S. Appl. No. 18/085,456.
Non-Final Office Action dated Feb. 23, 2024 in U.S. Appl. No. 18/099,962.
Notice of Allowance dated Oct. 18, 2023 in U.S. Appl. No. 18/108,459.
Non-Final Office Action dated Apr. 16, 2024 in U.S. Appl. No. 18/206,473.
Final Office Action dated Aug. 6, 2024 in U.S. Appl. No. 18/206,473.
International Search Report and Written Opinion dated Apr. 29, 2016 in Application No. PCT/US2015/061921.
International Search Report and Written Opinion in Aug. 16, 2017 in Application No. PCT/US2017/033540.
International Search Report and Written Opinion dated Jun. 19, 2017 in Application No. PCT/US2017/026609.
International Search Report and Written Opinion dated Dec. 3, 2018 in Application No. PCT/US2018/049411.
International Search Report and Written Opinion dated Dec. 3, 2018. Application No. PCT/US2018/049398.
International Search Report and Written Opinion dated Jan. 15, 2019 in Application No. PCT/US2018/054715.
International Search Report and Written Opinion dated Mar. 6, 2019 in Application No. PCT/US2018/042098.
International Search Report and Written Opinion dated Mar. 29, 2019 in Application No. PCT/US2018/064308.
International Search Report and Written Opinion dated Jun. 6, 2019 in Application No. PCT/US2019/018431.
International Search Report and Written Opinion dated Jul. 29, 2019 in Application No. PCT/US2019/32066.
International Search Report and Written Opinion dated Jan. 28, 2020 in Application No. PCT/US2019/057492.
International Search Report and Written Opinion dated Mar. 19, 2020 in Application No. PCT/US2019/057081.
International Search Report and Written Opinion dated Jun. 15, 2020 in Application No. PCT/US2020/029401.
International Search Report and Written Opinion dated Apr. 6, 2021 in Application No. PCT/US2021/015106.
International Search Report and Written Opinion dated Feb. 16, 2022 in Application No. PCT/US2021/056910.
International Search Report and Written Opinion dated May 11, 2022 in Application No. PCT/US2022/012909.
International Search Report and Written Opinion dated Feb. 22, 2023 in Application No. PCT/US2022/45951.
International Search Report and Written Opinion dated Aug. 17, 2023 in Application No. PCT/US2023/015750.
International Search Report and Written Opinion dated Jun. 21, 2024 in Application No. PCT/US2024/016403.
European Search Report dated Jun. 7, 2019 in European Application No. 15825979.
European Search Report dated Jan. 28, 2020 in European Application No. 15825979.
Office Action dated Oct. 31, 2019 in Chinese Application No. 201780033378.3.
Office Action dated Apr. 6, 2021 in Chinese Application No. 201780033378.3.
Office Action dated Aug. 4, 2021 in Chinese Application No. 201780033378.3.
Office Action dated Nov. 1, 2021 in Chinese Application No. 201780033378.3.
Office Action dated Feb. 4, 2020 in Brazilian Patent Application No. 112017021842.9.
Office Action dated Jul. 15, 2021 in Japanese Patent Application No. 2019-503636.
Office Action dated Apr. 28, 2021 in India Patent Application No. 20181704169.
Office Action dated Jul. 29, 2021 in India Patent Application No. 202017005710.
Office Action dated Mar. 1, 2022 in India Patent Application No. 202017014752.
Office Action dated Oct. 31, 2022 in India Patent Application No. 202117022077.
Office Action dated Mar. 6, 2023 in India Patent Application No. 202017037089.
Office Action dated Jan. 2, 2023 in India Patent Application No. 202117022031.
Office Action dated Oct. 10, 2022 in Chinese Patent Application No. 202110545596.3.
Office Action dated May 5, 2023 in Chinese Patent Application No. 201780044144.9.
Office Action dated Jun. 1, 2023 in Chinese Patent Applciation No. 202080030614.8.
Office Action dated May 17, 2023 in European Patent Application No. 19802405.1.
Office Action dated Jun. 6, 20233 in European Patent Application No. 21747270.3.
Ali et al., "Desiccant Enhanced Nocturnal Radiative Cooling-Solar Collector System for Air Comfort Application in Hot Arid Areas," Int. J. of Thermal & Environmental Engineering, vol. 5, No. 1, pp. 71-82 (2013).
Anand et al., "Solar Cooling Systems for Climate Change Mitigation: A Review," Renewable and Sustainable Energy Reviews, vol. 41, pp. 143-161 (2015).
Critoph et al., "Solar Energy for Cooling and Refrigeration," Engineering Department, University of Warwick, Coventry CV4 7AL, United Kingdom (1997).
De Antonellis et al., "Simulation, Performance Analysis and Optimization of Desiccant Wheels," Energy and Buildings, vol. 42, No. 9, pp. 1386-1393 (2010).
Eriksson et al., "Diurnal Variations of Humidity and Ice Water Content in the Tropical Upper Troposphere," Atmos. Chem. Phys,. vol. 10, pp. 11519-11533 (2010).
European Solar Thermal Industry Federation (ESTIF), "Key Issues for Renewable Heat in Europe (K4RES-H)," Solar Assisted Cooling—WP3, Task 3.5, Contract EIE/04/204/S07.38607, pp. 1-21 (2006).
Gad et al., "Application of a Solar Desiccant/Collector System for Water Recovery From Atmospheric Air," Renewal Energy, vol. 22, No. 4, pp. 541-556 (2001).

(56) References Cited

OTHER PUBLICATIONS

Ge et al., "A Mathematical Model for Predicting the Performance of a Compound Desiccant Wheel (A Model of a Compound Desiccant Wheel)," Applied Thermal Engineering, vol. 30, No. 8, pp. 1005-1015 (2010).

Gentile et al., "Water production from the atmosphere in arid climates using low grade solar heat", IEA SHC International Conference on Solar Heating and Cooling for Buildings and Industry, pp. 1-12 (2017).

Hanikel, et al., "Rapid Cycling and Exceptional Yield in a Melal-Organic Framework Water Harvester" ACS Cent. Sci. (2019).

Kim, "Development of Adsorption-based Atmospheric Water Harvesting and Thermal Energy Storage Technologies", Massachusetts Institute of Technology, pp. 1-146 (2018).

Kim et al, "Water Harvesting From Air With Metal-Organic Frameworks Powered By Natural Sunlight" Science vol. 356, pp. 1-3 (2017).

Kassem et al., "Solar Powered Dehumidification Systems Using Desert Evaporative Coolers: Review," International Journal of Engineering and Advanced Technology {IJEAT), ISSN: 2249-8958, vol. 3, Issue I, (2013).

Kolewar et al., "Feasability of Solar Desiccant Evaporative Cooling: A Review," International Journal of Scientific & Engineering Research, ISSN: 2229-5518, vol. 5, Issue 10 (2014).

Kozubal et al., "Desiccant Enhanced Evaporative Air-Conditioning {DEVap): Evaluation of a New Concept in Ultra Efficient Air Conditioning," National Renewal Energy Laboratory {NREL), Technical Report, NREL/TP-5500-49722 (2011).

La et al., "Technical Development of Rotary Desiccant Dehumidification and Air Conditioning: A Review," Renewable and Sustainable Energy Reviews, vol. 14, pp. 130-147 (2010).

Nia et al., "Modeling and Simulation of Desiccant Wheel for Air Conditioning," Energy and Buildings, vol. 38, No. 10, pp. 1230-1239 (2006).

Verougstraete et al., "A New Honeycomb Carbon Monolith for CO2 Capture by Rapid Temperature Swing Adsorption Using Steam Regeneration", Chemical Engineering Journal 383 (2020).

Wahlgren, "Atmospheric Water Vapour Processor Designs for Potable Water Production: A Review," Wat. Res., vol. 35, No. 1, pp. 1-22 (2001).

William et al., "Desiccant System for Water Production From Humid Air Using Solar Energy," Energy, vol. 90, pp. 1707-1720 (2015).

PV Performance Modeling Collaborative. (2014). Irradiance & Insolation. Accessed Aug. 18, 2021 at https://pvpmc.sandia.gov/modeling-steps/1-weather-design-inputs/irradiance-and-insolation-2/ (Year: 2014).

ACS. (2012). A Single-Layer Atmosphere Model. Accessed on Aug. 17, 2021 at https://www.acs.org/content/acs/en/ climatescience/atmosphericwarming/singlelayermodel.html (Year: 2012).

Materials Technology. (2010). UV Exposure Across Surface of Earth. Accessed Aug. 17, 2021 at http://www.drb-mattech.co.uk/uv%20map.html (Year: 2010).

* cited by examiner

THERMAL DESICCANT SYSTEMS AND METHODS FOR GENERATING LIQUID WATER

CROSS-REFERENCE TO RELATED APPLICATIONS

This application is a continuation of U.S. patent application Ser. No. 17/859,971 filed on Jul. 7, 2022 entitled "THERMAL DESICCANT SYSTEMS AND METHODS FOR GENERATING LIQUID WATER," which is continuation of U.S. patent application Ser. No. 16/855,965 filed on Apr. 22, 2020 entitled "THERMAL DESICCANT SYSTEMS AND METHODS FOR GENERATING LIQUID WATER," which claims priority to, and the benefit of, U.S. Provisional Patent Application Ser. No. 62/837,115 filed on Apr. 22, 2019 entitled "THERMAL DESICCANT SYSTEMS AND METHODS FOR GENERATING LIQUID WATER," and U.S. Provisional Patent Application Ser. No. 62/939,478 filed on Nov. 22, 2019, entitled "THERMAL DESICCANT SYSTEMS AND METHODS FOR GENERATING LIQUID WATER." The contents of the above-identified applications are incorporated herein by reference in their entireties.

FIELD

This disclosure is related to systems, methods, apparatuses and techniques for generating liquid water from ambient air.

BACKGROUND

Producing liquid water by extracting water vapor from ambient air or atmospheric air can present various challenges. Certain challenges include those associated with maximizing a water production rate and/or efficiency at a low cost and high reliability. There exists a need for improved systems and methods for producing liquid water from ambient air or atmospheric air.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. Views in the figures are drawn to scale (unless otherwise noted), meaning the sizes of the depicted elements are accurate relative to each other for at least the embodiment in the view.

DETAILED DESCRIPTION

Figure 1:
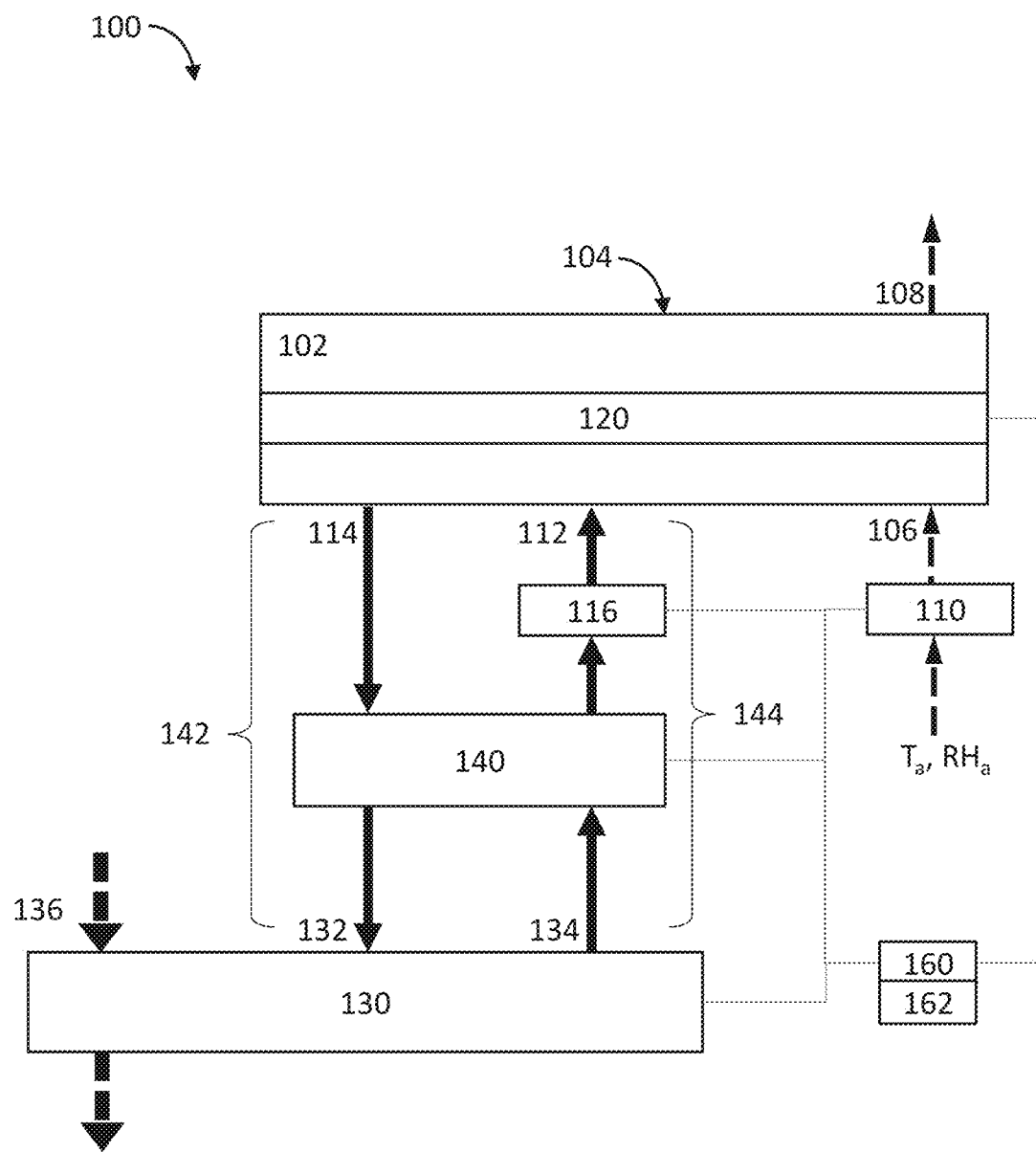
FIG. 1 depicts a water generation system including a thermal desiccant, enthalpy exchange unit and condenser, in accordance with various embodiments.

This disclosure includes embodiments of systems and methods, such as, for example, for generating liquid water from air. The term "coupled" is defined as connected, although not necessarily directly, and not necessarily mechanically. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially" and "approximately" may be substituted with "within [a percentage] of" what is specified, where the percentage may comprise 0.1, 1, 5, or 10%. Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements Likewise, a method that "comprises," "has," "includes," or "contains" one or more operations or steps possesses those one or more operations or steps, but is not limited to possessing only those one or more operations or steps.

As used in this disclosure, the terms "sorption," "adsorption," "absorption," and the like, may be interchangeable. While it is generally appreciated that absorption is a bulk phenomenon and adsorption is a surface-based phenomenon, the hygroscopic materials, desiccants and/or sorption mediums of the present disclosure may capture water vapor by adsorption, absorption, or a combination thereof.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. The feature or features of one embodiment may be applied to other embodiments or implementations, even though not described or illustrated, unless expressly prohibited by this disclosure or the nature of the embodiments.

As will be described in detail below, this disclosure introduces various approaches for efficient water production by maintaining a net flux of captured and released water vapor towards a condenser in a closed-loop system which includes a thermal desiccant unit. The systems and methods described herein efficiently provide a continuous driving force for release of water captured by a thermal desiccant unit to a working or transfer medium for condensation at a condenser at any given time during system operation. As described herein, thermal desiccant units combine a working medium in a flowing architecture for production of water vapor and heat in parallel. Passive and/or active control schemes can be employed to maintain a gradient enabling efficient water production. Some of these approaches can include deliberate enthalpic energy exchange to drive system conditions in which a recirculating working medium is driven to continuously move water to a condenser with additional energy acquired by the system further evolving water vapor towards the condenser.

Some details associated with the embodiments described above and others are described below.

FIG. 1 depicts a water generation system 100 for generating liquid water from a process gas containing water vapor, for example ambient air. The water generation system 100 comprises a thermal desiccant unit 102 including a housing 104, a process gas inlet 106 to allow a process gas to enter thermal desiccant unit 102 and a process gas outlet 108 to allow the process gas to exit thermal desiccant unit 102. For clarity, the process gas flow is indicated by arrows with narrow dashed lines. The process gas inlet 106 and/or process gas outlet 108 can comprise a valve or other flow management device to allow process gas (e.g. ambient air) to enter the thermal desiccant unit 102, for example during a load time or load cycle and can be sealed or otherwise closed at other times. The process gas inlet 106 and/or process gas outlet 108 can be architected or configured to equilibrate and distribute the process gas by using any desirable static or active means, for example, flow dividers, separators, baffles, flow straighteners, and/or manifolds. System 100 can further include a process blower or fan 110 to increase or adjust the flow rate of ambient air into the thermal desiccant unit 102. The process gas can be characterized by an ambient temperature Ta and relative humidity RHa.

The thermal desiccant unit 102 further comprises a porous hygroscopic material 120 located within the housing 104. The porous hygroscopic material 120 is retained within the housing 104 of thermal desiccant unit 102 and can be configured to capture water vapor from the process gas, for example during a load time or load cycle. The term 'porous' or 'porosity' as used herein can describe a flow-through implementation, as opposed to flow-over or flat plate implementation of the hygroscopic material in the thermal desiccant unit. Flow-over or flat plate implementations may be employed without departing from the scope of this invention. However, in various embodiments, a flow-through implementation allows for small boundary layers with a high degree of percolation. Stated differently, in various embodiments, a flow-through implementation decreases resistance to vapor flux across the hygroscopic material and/or improves distribution of the process gas across a large area of the hygroscopic material, either or both of which may result in improved water vapor capture by the hygroscopic material.

The porous hygroscopic material 120 can be further configured to absorb thermal energy (e.g. radiative solar thermal energy) and release captured water vapor to a working or regeneration fluid, for example during a release time or release cycle. The porous hygroscopic material 120 can be arranged within a flow distributor, such as but not limited to a lattice structure, top and bottom rigid porous plates, inter-corrugated fluidic channels, and/or woven and fiber meshes to sustain back pressure and distribute the flow. The working fluid can be a gas, for example air, which circulates through system 100 in a working gas flow path indicated by solid bold arrows in FIG. 1. The working fluid can be a gas, for example air. The working gas flow path can be substantially closed-loop and can include the following flow segments: a first working flow path segment within thermal desiccant unit 102, a second working fluid path segment 142 from the thermal desiccant unit 102 to a condenser 130, a third working flow path segment within the condenser 130 and a fourth working fluid path segment 144 from the condenser 130 to the thermal desiccant unit 102.

The porous hygroscopic material 120 can be provided as one or more layered structures, a packed bed of hygroscopic particles or beads or a substantially continuous or monolithic structure. The porous hygroscopic material 120 can include one or more light absorbing or light activated hygroscopic materials. In one example, hygroscopic particles may be agglomerated via a binder or dispersed in a high surface area matrix or support medium. The hygroscopic material and/or a support medium (if present) can be selected to minimize reflection of solar radiation and/or improve absorption or conduction of thermal energy. For example, the hygroscopic material and/or a support medium (if present) can be dark or black in color. In some embodiments, the hygroscopic material can be mixed, combined and/or embedded with materials or structures to efficiently absorb and/or transfer heat. For example, the hygroscopic material can be dispersed around a metallic structure with a thermal conductivity greater than 50 W/mK. In other embodiments, the hygroscopic material is a self-supporting structure housed within the thermal desiccant unit. In one example, the porous hygroscopic material is selected to uptake 50-300% of its own mass as water vapor.

Hygroscopic materials, sorption media or desiccants (e.g., 120) of the present systems can comprise any desirable medium in any desirable configuration (e.g., such that the hygroscopic material, desiccant or sorption medium is capable of adsorption and desorption of water). The following description of hygroscopic materials and sorption mediums is provided only by way of example. In some implementations, the hygroscopic material is capable of sorption at a first temperature, relative humidity and/or pressure and desorption at a second temperature, relative humidity and/or pressure. The hygroscopic material can be provided as a liquid, solid, and/or combinations thereof. The hygroscopic material can be provided as a porous solid impregnated with hygroscopic materials. For example, the hygroscopic material may comprise one or more materials of silica, silica gel, alumina, alumina gel, montmorillonite clay, zeolites, molecular sieves, metal-organic frameworks, activated carbon, metal oxides, lithium salts, calcium salts, potassium salts, sodium salts, magnesium salts, phosphoric salts, organic salts, metal salts, glycerin, glycols, hydrophilic polymers, polyols, polypropylene fibers, cellulosic fibers, derivatives thereof, and combinations of thereof. However, the hygroscopic material any medium suitable for use in a thermal desiccant unit. In some embodiments, the hygroscopic material can be selected and/or configured to avoid sorption of certain molecules (e.g., those molecules that may be poisonous or otherwise harmful when consumed by, contacted by, and/or exposed to, a human or other organism). The term "sorption," as used herein, refers to absorption, adsorption or a combination thereof.

In various embodiments, the thermal desiccant unit 102 comprises a photovoltaic (PV) panel. The photovoltaic panel may be comprised of one or more photovoltaic cells. The photovoltaic panel may be disposed generally adjacent to porous hygroscopic material 120. The photovoltaic panel may be disposed generally parallel to porous hygroscopic material 120. The photovoltaic panel may be disposed within housing 104. However, the photovoltaic panel may be disposed in, and/or, on any portion, layer, and/or material of the thermal desiccant unit 102 suitable for the generation of electrical energy by the photovoltaic panel and/or transmission of heat to porous hygroscopic material 120. In various embodiments, electrical energy generated by the photovoltaic panel is utilized by the water generation system 100 to power electrical components thereof including fans, pumps, blowers, valves, controllers, batteries or battery systems, and any other components of water generation system 100.

Figure 13:
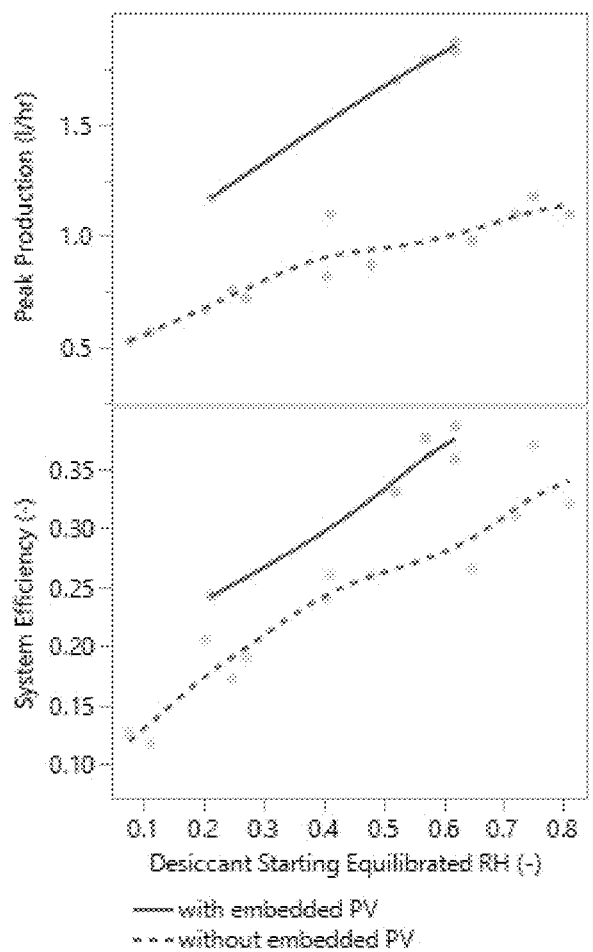
FIG. 13 depicts data plots showing a maximum water production rate (liters of water per hour) and total system efficiency for a system with an embedded photovoltaic (PV) panel and a system without an embedded photovoltaic (PV) panel.

In various embodiments, the photovoltaic panel generates heat and/or releases generated heat to porous hygroscopic material 120 or other components of thermal desiccant unit 102. This heat may be generated by direct solar irradiance on the photovoltaic panel and/or by heat release from the inefficiency of the photovoltaic process. In various embodiments, heat generated by the photovoltaic panel improves release of water vapor from porous hygroscopic material 120 during a release time or release cycle. In FIG. 13, maximum water production and system efficiency are compared in a tested system comprising a photovoltaic (PV) panel and a tested system lacking a photovoltaic (PV) panel. The maximum water production rate was measured from when the system was loaded to a designated RH on the porous hygroscopic material, and subjected to a solar irradiance of 7000 Whr/m$^2$ over a period of time. As used herein, system efficiency means the equivalent energy of the total water produced to the total solar irradiance incident on active areas of the porous hygroscopic material and the photovoltaic (PV) panel. As shown in FIG. 13, water generation systems comprising a photovoltaic panel (PV) may be configured for increased water production and/or system efficiency.

The thermal desiccant unit 102 includes a working fluid inlet 112 to allow a working fluid to enter thermal desiccant unit 102 and a working fluid outlet 114 to allow the working fluid to exit the thermal desiccant unit 102. The working fluid inlet 112 and/or working fluid outlet 114 can comprise a valve or other flow management device to allow the working fluid gas to enter the thermal desiccant unit 102, for example during a release time or release cycle and can be sealed or otherwise closed at other times. System 100 can further include one or more working fluid blowers or fans 116 to increase or adjust the flow rate of the working fluid into the thermal desiccant unit 102. During a release time, the working fluid can accumulate both heat and water vapor upon flowing from fluid inlet 112, through the porous hygroscopic material 120, and to the fluid outlet 114. In various embodiments, a thermal desiccant unit 102 can include any desirable number of fluid inlets and fluid outlets for the process and/or working fluid entry and egress from the thermal desiccant housing. In various embodiments, the thermal desiccant unit can include any desirable fluid pathway or routing approaches for the process and/or working fluid via any desirable structure or mechanism intern and/or external to the thermal desiccant housing but not limited to flow dividers and/or inlet and outlet manifolds.

In various embodiments, the number of fans and/or blowers can be minimized and/or reduced to decrease costs, maintenance, and/or other complexities. For example, a single fan may be provided instead of fans 110 and 116 as depicted in FIG. 1, and any desirable valve (e.g., one or more 3-way valves) and/or other pneumatic or fluid-routing devices can be employed to change operational flow between process and working fluid, As depicted in FIG. 1, the water generation system 100 can further comprise a condenser 130 for condensing water vapor from the working fluid which can enter the condenser 130 at a condenser inlet 132 and exit through a condenser outlet 134. Condenser 130 is configured to receive working fluid in the working fluid pathway and produce liquid water from the received fluid (e.g., by condensing water vapor in fluid in the working fluid pathway). Condensers of the present disclosure may comprise any suitable material and can be configured into any desirable configuration (e.g., to efficiently condense water vapor in working fluid into liquid water). For example, suitable condensers may comprise polymers, metals, and/or the like. Condensers can comprise coils, fins, plates, tortuous passages, and/or the like. In some implementations, condenser 130 can be cooled by ambient air in an ambient air pathway 136 with or without the aid of a fan or blower. For clarity, the ambient air pathway is indicated by arrows with wide dashed lines. In one example, the blower or fan 110 can be configured or repurposed to provide cooling air via ambient air pathway 136 to the condenser 130 during the release time or release cycle. Condensers can be configured to transfer thermal energy from the working fluid downstream of the thermal desiccant unit to air in ambient air pathway 136 (e.g., such that air in ambient air pathway 136 facilitates cooling of condenser 130). In various embodiments, the condenser 130 can be assisted by an active cooling device, such as but not limited to vapor compression cycles, thermo-electric devices, and/or heat recirculating pumped fluids.

The water generation system 100 can further comprise an enthalpy exchange unit 140 operatively coupled between the thermal desiccant unit 102 and the condenser 130. The enthalpy exchange unit 140 can exchange sensible energy (i.e. heat) and/or latent energy (i.e. moisture) between the working fluid in the second working fluid pathway segment 142 and the fourth working fluid pathway segment 144. In various embodiments, the enthalpy exchange unit 140 can transfer enthalpy between the working fluid output from the thermal desiccant unit 102 and the working fluid input to the thermal desiccant unit 102. In various embodiments, the enthalpy exchange unit 140 can transfer enthalpy between the working fluid output from the condenser 130 and the working fluid input to the condenser 130. The enthalpy exchange unit 140 enables recovery of the sensible and/or latent energy for efficient operation of system 100. In various embodiments, the enthalpy exchange unit 140 can transfer heat from a working fluid flow with a higher temperature value to a working fluid flow with a lower temperature value. In various embodiments, the enthalpy exchange unit 140 can transfer water vapor from a working fluid flow with a higher water vapor pressure to a working fluid flow with a lower water vapor pressure.

In various embodiments, enthalpy exchange unit 140 is configured to transfer moisture from a first portion of the working fluid (for example, working fluid disposed in the second working fluid pathway segment 142) to a second portion of the working fluid that enters condenser inlet 132. In various embodiments, enthalpy exchange unit 140 is configured to transfer heat from a third portion of the working fluid (for example, working fluid disposed in the fourth working fluid pathway segment 144) to a fourth portion of the working fluid that enters working fluid inlet 112.

The enthalpy exchange unit 140 can be a passive sensible heat transfer unit (e.g. a heat exchanger), a passive latent energy transfer unit (e.g. vapor transfer membrane), a passive total heat (i.e. sensible and latent energy) transfer unit (e.g. rotary desiccant wheel), or an active heat transfer unit (refrigeration unit, vapor compression cycling unit). In some implementations, both heat (i.e. sensible) energy and moisture (i.e. latent) energy is exchanged by the enthalpy exchange unit 140. In other implementations, only sensible heat is exchanged, for example with a conventional heat exchanger. Sensible heat can be transferred in the form of a temperature difference between one or more working fluid pathway segments via the enthalpy exchange unit 140. Latent heat can be transferred in the form of a moisture difference between different working fluid pathway segments via the enthalpy exchange unit 140. In some implementations, the enthalpy exchange unit 140 can comprise a plurality of sub-units, for example a separate heat exchange sub-unit and a moisture exchange sub-unit, and/or multiple heat and/or moisture exchange sub-units.

System 100 includes a controller 160 configured to control system 100 to maintain a net flux of water vapor transferred by the working gas to the condenser 130, and thereby maximize the production of liquid water at condenser 130. Controller 160 can maximize the production of liquid water at the condenser 130 by optimizing or adjusting the exchange rate of the enthalpy exchange unit 140 (e.g., by adjusting rate of rotation for a rotary desiccant), the flow rate of the working fluid in the working fluid pathway (e.g. via fan 116) or a combination thereof. As used herein, the terms "exchange rate" or "enthalpy exchange rate" mean a rate of energy change and is used interchangeably herein to refer to a rate of heat exchange in the enthalpy exchange unit, a rate of water production, and/or a rate of temperature change, and may be described units of Watts and/or kg/hr.

The control system can dynamically maximize the production of liquid water over the diurnal cycle based on current or forecast ambient conditions (e.g. solar insolation, ambient temperature, ambient humidity), current or forecast system properties (e.g. working fluid temperature, working fluid humidity, water content of hygroscopic materials of the system). The control system can use a set of sensors, an onboard deterministic and/or machine learning algorithm, information regarding the thermodynamics of water vapor, information regarding the properties of the hygroscopic materials, information regarding the amount of liquid water produced, information regarding the amount of water vapor retained by the thermal desiccant unit, and/or other factors that can be synthesized in the controller to optimize water production at the condenser.

Various approaches can be employed to control or maximize the production of water by system 100 by driving the water vapor captured by the hygroscopic material 120 during the load time towards vapor pressure saturation in the working fluid during the release time. Stated differently, system 100 may be controlled and/or configured to maximize relative humidity of the working fluid at and/or near condenser inlet 132 and/or in condenser 130. Controller 160 can operate the system 100 to vary the exchange rate of the enthalpy exchange unit 140 based on an ambient solar flux, an ambient temperature, an ambient relative humidity, a temperature of the working fluid, a relative humidity of the working fluid, an amount of water present in the hygroscopic material 120, an elapsed time, a user input and so on. For example, under conditions of low solar flux, the controller may reduce a working fluid flow rate so as to increase a temperature of the working fluid and a rate of water vapor desorption from the porous hygroscopic material. For example, under certain conditions, an increase in an exchange rate of the enthalpy exchange unit 140 may increase the relative humidity of the working fluid at condenser inlet 132 and/or in condenser 130.

Controller 160 can operate the system 100 based on one or more of: a user selection, data received from one or more sensors, forecast conditions, programmatic control, and/or by any other desirable bases. Controller 160 can be associated with peripheral devices (including sensors) for sensing data information, data collection components for storing data information, and/or communication components for communicating data information relating to the operation of the system. Inputs to controller 160 may be measured in that they are indicated in data captured by one or more sensors. In one example, the controller 160 can set process gas flow rates, working fluid flow or circulation rates, enthalpy exchange rates (e.g., by adjusting rotation rate of rotary desiccant), transitions between load and release times based on a look up table of parameters stored onboard the controller. In yet another example, the controller can self-adjust process gas flow rates, enthalpy exchange rates, load/release transition times and monitor water production signals in an effort to self-teach or learn optimum setpoints.

Controller 160 can be programmed or configured to optimize liquid water production based on measurements of one or more inputs (e.g., such that controller 160 may optimize liquid water production based on current or expected environmental and system conditions) including but not limited to external conditions like ambient air temperature, ambient pressure, ambient air relative humidity, solar insolation, solar flux, weather forecast, time of day, and so on. Furthermore, controller 160 can be programmed or configured to optimize liquid water production based on inputs relating to system operational parameters like working fluid temperature, working fluid pressure, working fluid relative humidity, working fluid water vapor partial pressure, condenser discharge temperature, liquid water production rate, liquid water production volume, liquid water usage rate, liquid water quality and so on.

During a load time, the flow rate of the process gas (e.g. ambient air) into thermal desiccant unit 102 can be varied by controller 160 in wired or wireless communication with fan 110. During a release time, the flow rate of the working fluid can be varied by controller 160 in wired or wireless communication with fan 116 based on ambient solar flux, ambient temperature, ambient relative humidity, temperature of the working fluid, relative humidity of the working fluid, amount of water present in the hygroscopic material 120, an elapsed time, or a combination thereof. During a release time, the enthalpy exchange rate can be varied by controller 160 in wired or wireless communication with enthalpy exchange unit 140 based on input variables of based on ambient solar flux, ambient temperature, ambient relative humidity, temperature of the working fluid, relative humidity of the working fluid, amount of water present in the hygroscopic material 120, an elapsed time, or a combination thereof. In one particular implementation in which the enthalpy exchange unit is a rotary desiccant wheel, the enthalpy exchange rate can be varied by varying the rotation rate of the rotary desiccant wheel.

System 100 can comprise a telematics unit 162 (e.g., a transmitter, receiver, transponder, transverter, repeater, transceiver, and/or the like) to communicate operational parameters and/or data to and/or from system 100 (e.g., controller 160) via a wired and/or wireless interface. In on example, wireless communications can conform to standardized communications protocols, such as, for example, GSM, SMS components operating at relatively low rates (e.g., operating every few minutes), protocols that may be geographically specified, and/or the like).

System 100 can comprise indicators (e.g., lights, such as, for example, LEDs), which may be configured to provide information regarding system operation. For example, in some embodiments, indicator lights may be configured to provide information (e.g., visually, for example, to a user) that the system is running, that solar power or insolation is available, that maintenance is recommended, or a component has failed and/or is failing, and/or the like. Any desirable information (including the information described above with reference to indicators) may be transmitted over a communications network (e.g., alone and/or in addition to operation of any indicators).

In various embodiments, system 100 can include or be associated with one or more energy generation and/or storage systems (e.g., photovoltaic panel, battery, etc.). For example, system 100 can include a battery system for storage of energy collected during daylight hours (e.g., via a photovoltaic panel) and utilization during off-solar hours. Any desirable energy source for auxiliary components or otherwise can be employed by system 100 including, but not limited to, solar, auxiliary, AC/DC, etc.

FIGS. 1-3 and 5-8 illustrate some implementations of water generation systems and related components. Unless otherwise specified below, the numerical indicators used to refer to components in FIGS. 2-3 and 5-8 are similar to those used to refer to components or features in FIG. 1 above, except that the index has been incremented by 100.

Figure 2:
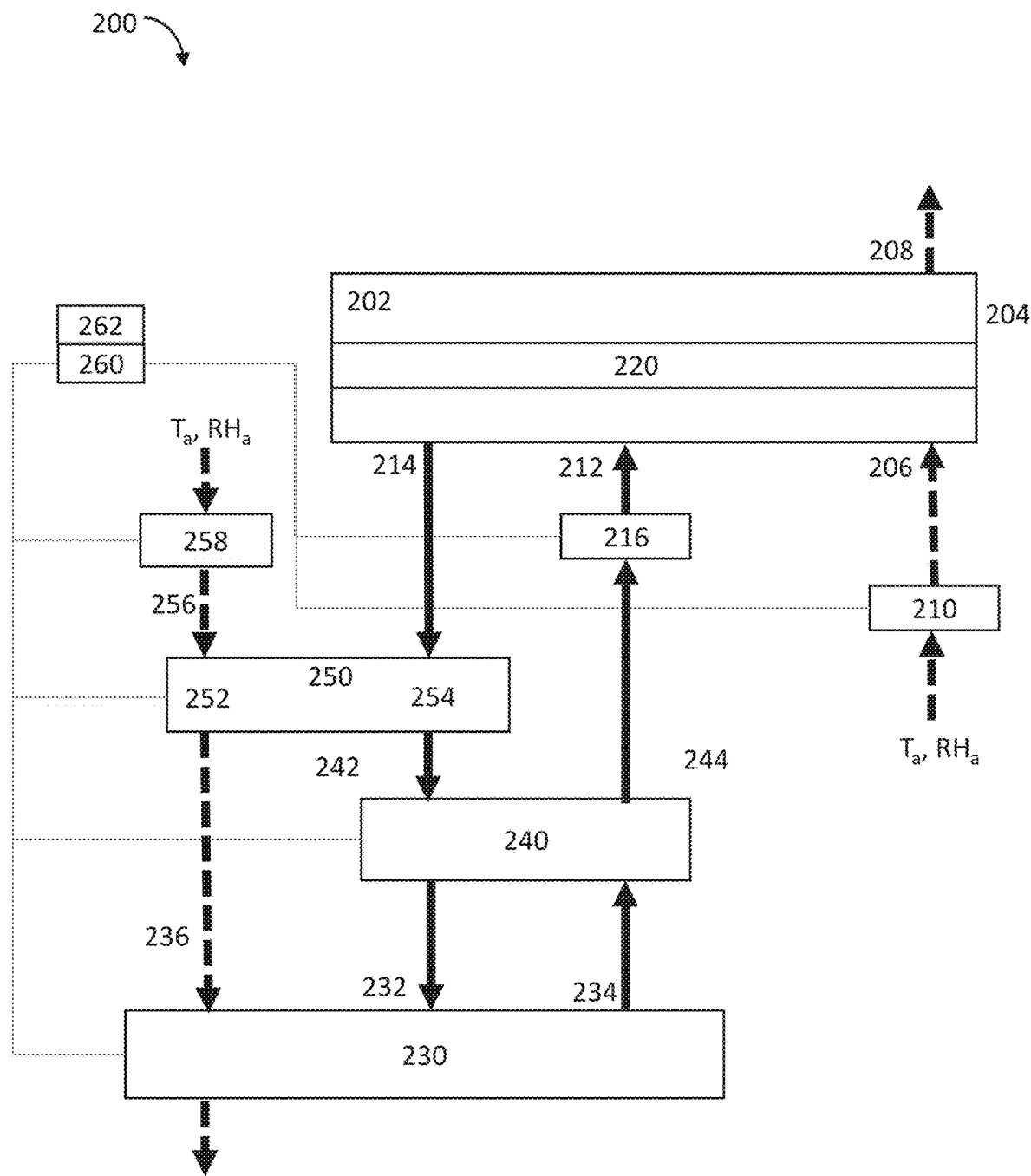
FIG. 2 depicts a water generation system including a thermal desiccant, auxiliary desiccant unit, enthalpy exchange unit and condenser, in accordance with various embodiments.

FIG. 2 depicts a water generation system 200 comprising a thermal desiccant unit 202, a condenser 230 and an enthalpy exchange unit 240. System 200 further comprises an auxiliary desiccant unit 250 comprising a hygroscopic material that can be transitioned between an adsorption zone 252 and a desorption zone 254 of the auxiliary desiccant unit 250. In one approach, the hygroscopic material 220 of the thermal desiccant unit 202 is different from the hygroscopic material of the auxiliary desiccant unit 250. For example, the hygroscopic materials of the thermal desiccant unit and the auxiliary desiccant unit can vary based on water uptake mass percentage, water uptake and release rates (in some cases as a function of exposed humidity and temperature), water uptake and release rates as a function of air flow rates, and so on. In one non-limiting example, the hygroscopic material in the thermal desiccant unit 202 has a higher water uptake capacity than the hygroscopic material in the auxiliary desiccant unit 250. In another non-limiting example, the hygroscopic material in the auxiliary desiccant unit 250 has a higher water uptake or release rate than the hygroscopic material in the thermal desiccant unit 202.

In one implementation, the auxiliary desiccant unit is a rotary desiccant wherein the hygroscopic material is provided as a hygroscopic wheel rotated between the process gas and the working gas flows. In one operational example, the auxiliary desiccant unit can be active (e.g. rotated) during a release time or cycle and inactive or idle during a load time or cycle. In the adsorption zone 252, a process gas (e.g. ambient air) 256 may flow through the hygroscopic material in the adsorption zone 252 of the auxiliary desiccant unit 250. In the adsorption zone 252, the hygroscopic material may capture water vapor from the process gas 256. System 200 can further include a process blower or fan 258 to increase or adjust the flow rate of process gas 256 into the adsorption zone 252 of auxiliary desiccant unit 250. In one implementation, the process gas can be exhausted to the ambient environment after flowing through auxiliary desiccant unit 250. In another implementation, process gas 236 exiting the adsorption zone 252 of auxiliary desiccant unit 250 can be directed to condenser 230 to remove heat from the condenser to improve cooling capability and thereby liquid water generation rate of the condenser 230. In yet another implementation, the system can have a fan configured to adjust the flow rate of direct airflow across the condenser. In one implementation, the fans or blowers 210 and 258 can be the same component, with their function of providing a process gas (e.g., ambient air) through process gas inlet 206 and/or into auxiliary desiccant unit 250, activated via controlled valves and fluid pathways.

In the desorption zone 254, the hygroscopic material of the auxiliary desiccant unit 250 may release water to the working fluid subsequent to the thermal desiccant unit 202 and in advance of the condenser 230. As depicted in FIG. 2, the auxiliary desiccant unit 250 may be positioned such that hygroscopic material in desorption zone 254 releases water to the working fluid output from the thermal desiccant unit at 214 in advance of the enthalpy exchange unit 240 and the condenser 230. However, it should be appreciated that one or more auxiliary desiccant units may be positioned at different locations along the working fluid paths 242, 244.

During a load time, the flow rate of the process gas (e.g. ambient air) into thermal desiccant unit 202 can be varied by controller 260 in wired or wireless communication with fan 210. During the release time, the flow rate of the working fluid can be varied by controller 260 in wired or wireless communication with fan 216 based on ambient solar flux, ambient temperature, ambient relative humidity, temperature of the working fluid, relative humidity of the working fluid, amount of water present in the hygroscopic material 220, amount of water present in the hygroscopic material of auxiliary desiccant unit 250, an elapsed time, or a combination thereof. During the release time, the enthalpy exchange rate can be varied (e.g., by adjusting the rotation rate of the rotary desiccant wheel) by controller 260 in wired or wireless communication with enthalpy exchange unit 240 based on input variables of based on ambient solar flux, ambient temperature, ambient relative humidity, temperature of the working fluid, relative humidity of the working fluid, amount of water present in the hygroscopic material, an elapsed time, or a combination thereof. Furthermore, the rate of movement of the second hygroscopic material between the adsorption zone and the desorption zone of the auxiliary desiccant unit 250 (e.g. rotation rate of a rotary desiccant wheel) can be varied to maximize water production rate at the condenser 230 during the release time or release cycle. The rate of movement of hygroscopic material between the adsorption zone 252 and the desorption zone 254 of the auxiliary desiccant unit 250 can be based on ambient solar flux, ambient temperature, ambient relative humidity, temperature of the working fluid, relative humidity of the working fluid, amount of water present in the hygroscopic material 220 or 250, an elapsed time, or a combination thereof. In one example, the exchange rate of the auxiliary desiccant unit 250 can be controlled such that the temperature and relative humidity of the working fluid pathway 214, coupled with the amount of water vapor loaded at adsorption zone 252, results in a net water vapor increase into the working fluid path 242.

In water generation system 100 of FIG. 1, the amount of water introduced into or captured by system (for transfer via working fluid to condenser for condensation into liquid water) may be that amount of water captured by the thermal desiccant unit during a load time (e.g. during the nighttime). In the operation of system 200 of FIG. 2, in addition to the amount of water captured by the thermal desiccant unit 202, an additional amount of water can be introduced into system or captured by the auxiliary desiccant unit 250 during the release time (e.g. daytime). The additional amount of water introduced into system 200 by the auxiliary desiccant unit 250 may be captured continuously throughout the day, intermittently throughout the day or intermittently on one or more day/night cycles by the controller based on the actual/expected ambient conditions, working gas properties (e.g. temperature, relative humidity) and/or amount of water in the thermal desiccant unit. In system 100, the water sorption and release medium may not be independent from the thermal source of the system, i.e. the thermal desiccant unit. In system 200, the auxiliary desiccant unit may be relatively independent from the thermal source. In this way, system 200 may provide an additional degree of freedom for the controller to optimize water generation at the condenser. In an illustrative example, the controller can activate the auxiliary desiccant unit when the relative humidity of the working gas is below a predetermined value and deactivate the auxiliary desiccant unit when the relative humidity of the working gas is above a predetermined value to continuously increase the net flux of water vapor in the working fluid towards the condenser.

In various implementations, a thermal desiccant unit can be provided as a solar thermal desiccant unit that converts solar insolation to thermal energy by transferring energy from sunlight to the working fluid that flows through the solar thermal desiccant unit. In at least some examples, solar thermal desiccant units of the present technology may be configured such that the working fluid flows along one or more flow paths from the inlet to the outlet of the thermal desiccant unit.

Figure 3:
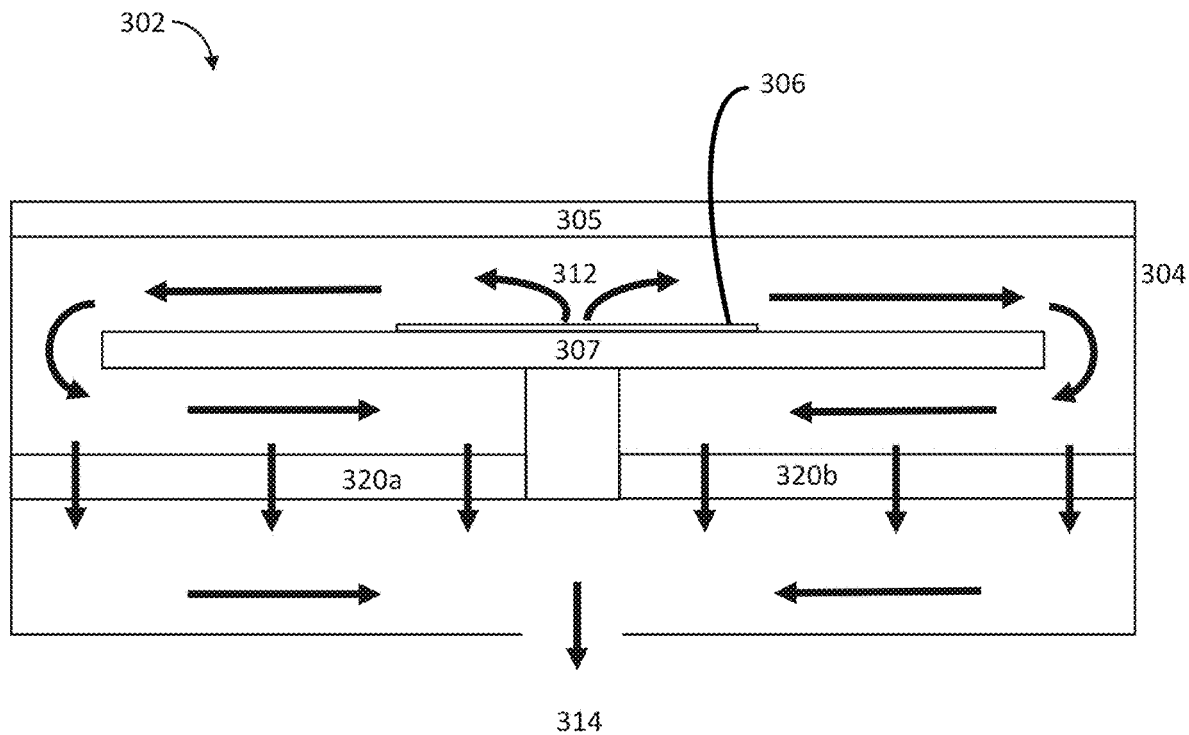
FIG. 3 depicts a thermal desiccant unit, in accordance with various embodiments.

FIG. 3 depicts an exemplary solar thermal desiccant unit comprising a transparent cover layer 305 (e.g. glass) configured to allow solar radiation to pass into the interior of thermal desiccant housing 304. The solar thermal desiccant unit 302 can comprise one or more interstitial layers (for example, interstitial layers similar to transparent cover layer 305) between the transparent cover layer and the porous hygroscopic material. One or more interstitial layers and/or transparent cover layer of a solar thermal desiccant unit may comprise a photovoltaic material, one or more photovoltaic cells, and/or a photovoltaic (PV) panel.

In various embodiments, solar thermal desiccant unit 302 comprises a photovoltaic (PV) panel 306. Photovoltaic panel 306 may be disposed generally adjacent interstitial layer 307. Photovoltaic panel 306 may be disposed generally parallel to interstitial layer 307. However, the photovoltaic panel 306 may be disposed in, and/or on, any portion, layer, and/or material of solar thermal desiccant unit 302 suitable for the generation of electrical energy by the photovoltaic panel and/or transmission of heat to the layer comprising the porous hygroscopic material 320a, 320b.

As depicted in FIG. 3, the working fluid can flow from fluid inlet 312 along the transparent cover layer 305 and interstitial layer 307, and then through the layer comprising the porous hygroscopic material 320a, 320b such that the working fluid collects heat from the interstitial layer 307 below the transparent cover layer 305 and collects water and heat from the porous hygroscopic material 320a, 320b before exiting the solar thermal desiccant unit 302 at fluid outlet 314. The solar thermal desiccant unit of FIG. 3 comprises a split-flow design including porous hygroscopic material 320a, 320b disposed in two layers and with two fluid flow pathways; however, additional fluid pathways or a single fluid flow pathway within the thermal desiccant unit can be employed in accordance with the embodiments described herein.

Figure 4:
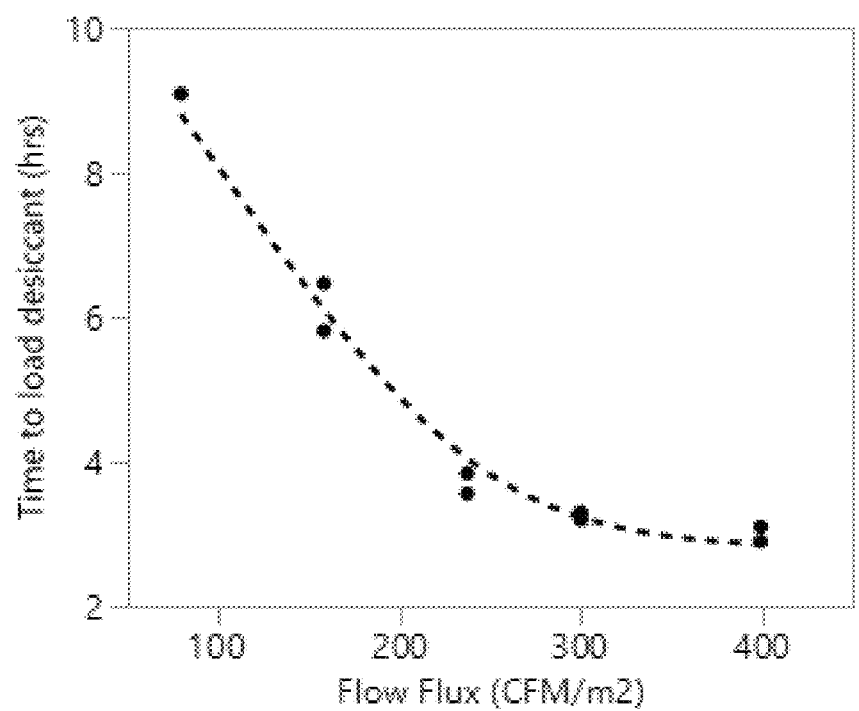
FIG. 4 depicts a plot of load time versus fluid flow flux, in accordance with various embodiments.

For water generation, a thermal desiccant unit can be configured to operationally improve the interaction of the process fluid with the hygroscopic material during the load time and/or the interaction of the working fluid with the hygroscopic material during the release time. FIG. 4 depicts exemplary data for a loading operation of an exemplary thermal desiccant unit. In various embodiments, an increase in the velocity or flow flux (i.e., flow rate of process air per area of the thermal desiccant unit in cubic feet per minute (CFM)) reduces the amount of time required to load the hygroscopic material in the thermal desiccant unit to a desired water uptake amount (e.g. water uptake mass percentage). By leveraging this water uptake behavior, the thermal desiccant units described herein can be configured to enable efficient water production by maintaining a high flux of captured and released water vapor through the thermal desiccant unit via thermal desiccant unit configuration and operation. This approach will be described in the following examples.

Figure 5:
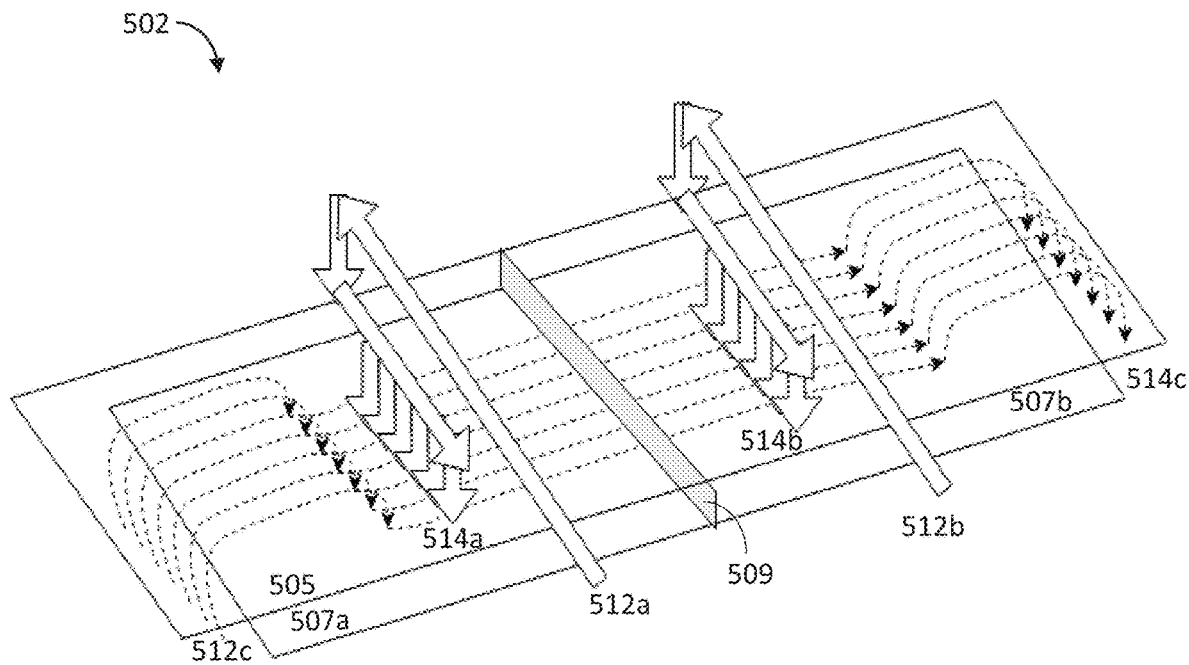
FIG. 5 depicts a thermal desiccant unit, in accordance with various embodiments.
Figure 6:
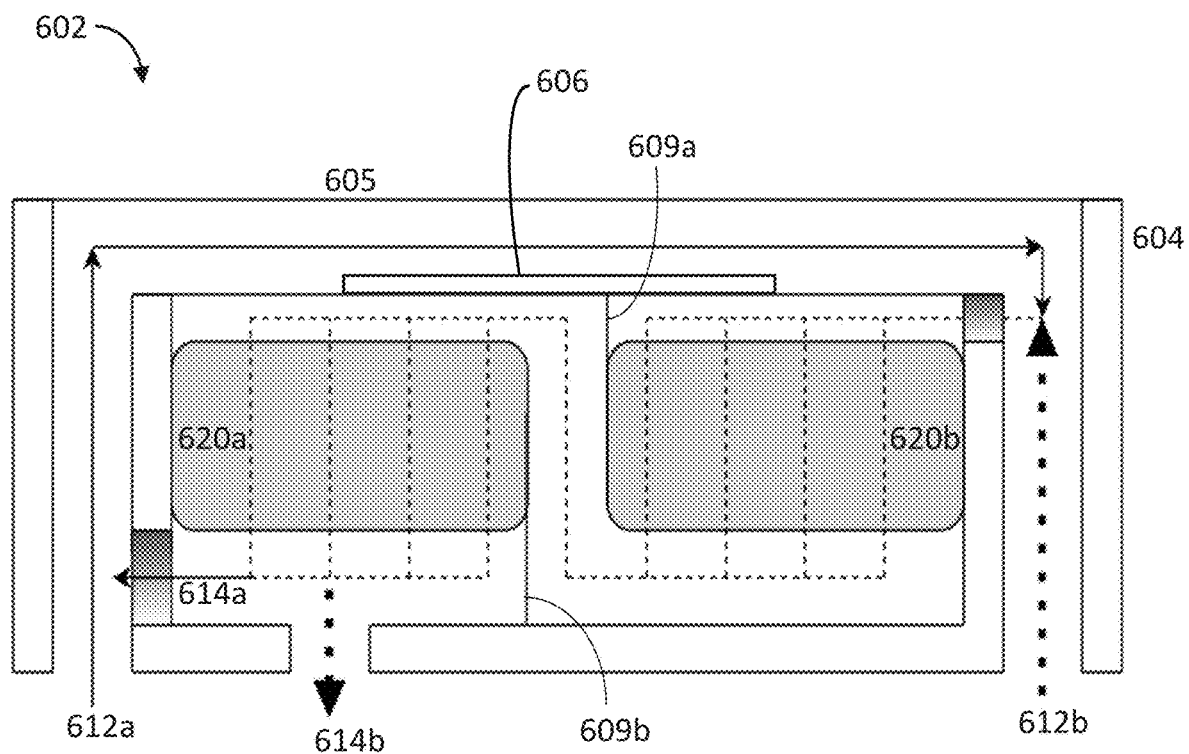
FIG. 6 depicts a thermal desiccant unit, in accordance with various embodiments.

FIG. 5 and FIG. 6 depict thermal desiccant units comprising flow architectures to both 1) increase flow flux of the process fluid during a load time and 2) efficiently transport absorbed solar heat from upper portions of a thermal desiccant unit to lower portions of the thermal desiccant unit via the working fluid during a release time. The hygroscopic material within the thermal desiccant unit can be configured around and/or within one or more flow separators, distributors, sectioned layers and/or segments according to favored flow paths for both uptake and release operations, thereby maximizing water generation.

FIG. 5 depicts a thermal desiccant unit 502 comprising a partitioned or segmented flow architecture to improve interaction and/or water transfer between the working fluid and the hygroscopic material via a substantially or overall top-to-bottom flow path in which heat absorbed from a top portion of the thermal desiccant unit is transferred to hygroscopic material at a lower portion of the thermal desiccant unit. In various embodiments, thermal desiccant unit 502 comprises a solar thermal desiccant unit and at least a portion of the heat absorbed from a top portion of the thermal desiccant unit comprises solar heat. In various embodiments, thermal desiccant unit 502 further comprises a photovoltaic panel and at least a portion of the heat absorbed from a top portion of the thermal desiccant unit comprises heat generated by the photovoltaic panel.

As depicted in FIG. 5, the working fluid flows (in a pathway depicted by solid arrows) from fluid inlets 512a and 512b along an upper portion 505 to collect heat, and then flows to a lower segmented portions or layers 507a and 507b defined by baffle or static separator 509 to collect water and heat from a segmented hygroscopic porous body of layers 507a and 507b before exiting the thermal desiccant unit 502 at lower segmented fluid outlets 514a and 514b. In this way, the working fluid efficiently transports absorbed solar heat through the thermal desiccant unit to maximize the water uptake from the hygroscopic material during the release time.

In various embodiments, the hygroscopic material in the thermal desiccant unit, the flow architecture of thermal desiccant unit 502 is configured to improve interaction of the process fluid with the hygroscopic material via serial exposure of the subdivided areas (e.g. 507a, 507b) to the same process fluid flow rate, thereby increasing flow flux of the process fluid during the load time. As depicted in FIG. 5, the process fluid comprising water vapor enters thermal desiccant unit 502 through inlet 512c and flows (in a pathway depicted by dashed lines) through the lower segmented portions or layers 507a, 507b, under separator 509, to deposit water in the hygroscopic porous body portion before exiting the thermal desiccant unit 502 at fluid outlet 514c. FIG. 5 depicts a single separator, however any desirable number and configuration of fluid inlets, fluid outlets, separators or other flow directing means, structures or devices can be provided to improve interaction of the process gas with the hygroscopic material at a high process gas flux. For example, various configurations of the thermal desiccant unit can be provided to maintain a process gas flux through the hygroscopic absorber preferably greater than 50 CFM/m2, greater than 100 CFM/m2, greater than 200 CFM/m2, greater than 300 CFM/m2 or greater than 400 CFM/m2.

The thermal desiccant unit 502 shown FIG. 5 depicts the working fluid path being introduced into the thermal desiccant unit at approximately perpendicularly (i.e., at about a 90 degree angle) relative to the process fluid path, and depicts a single separator 509 to maintain the desired top down flow of the working fluid, however any desirable configuration (e.g., spacing, placement, relative angles, etc.) and/or number of fluid inlets, fluid outlets, separators or other flow directing means, structures or devices can be provided to define the process and working fluid flow pathways in the thermal desiccant unit for both load and release operations. Furthermore, various flow approaches can be employed including flow-through hygroscopic body implementations, flow-over or flat plate implementations of the hygroscopic material, as well as their combinations or derivatives. In addition, the hygroscopic material can be configured in various ways relative to the flow directing means, structures or distributors, for example but not limited to lattice structures, rigid porous plates, inter-corrugated fluidic channels, and/or woven and fiber meshes to sustain back pressure and distribute the flow.

As another example, FIG. 6 depicts a thermal desiccant unit 602 comprising a partitioned or segmented flow architecture to improve interaction and/or water transfer between the process and/or working fluids and the hygroscopic material. The process fluid and the working fluid share at least a portion of the same flow path (as depicted by lightly dotted lines) defined via separators 609a and 609b between hygroscopic absorbers 620a and 620b. The shared flow path can achieve a primarily top-down direction of flow for the working fluid through the porous hygroscopic material in absorbers 620a and 620b while also achieving a high process flow flux through hygroscopic absorbers 620a and 620b.

In various embodiments, thermal desiccant unit 602 comprises a solar thermal desiccant unit. In various embodiments, thermal desiccant unit 602 comprises a photovoltaic (PV) panel 606. Photovoltaic panel 606 may be disposed generally parallel to cover layer 605. However, the photovoltaic panel 306 may be disposed in, and/or on, any portion, layer, and/or material of thermal desiccant unit 602 suitable for the generation of electrical energy by the photovoltaic panel and/or transmission of heat to absorbers 620a and 620b.

As depicted in FIG. 6, the working fluid flows (in a pathway indicated by continuous and lightly dotted lines) from fluid inlet 612a along cover layer 605 collecting heat, and then flows through lower segmented hygroscopic absorbers 620a and 620b in path defined by separators 609a and 609b to collect water and heat from hygroscopic absorbers 620a and 620b before exiting the thermal desiccant unit 602 at lower fluid outlet 614a. In this way, the working fluid efficiently transports absorbed solar heat through the thermal desiccant unit to maximize the water uptake from the hygroscopic material during the release time.

The flow architecture of thermal desiccant unit 602 also improves interaction or water exchange of the process fluid via serial exposure of the subdivided absorber 620a and 620b to the same process fluid flow rate, thereby increasing flow flux of the process fluid during the load time. As depicted in FIG. 6, the process fluid comprising water vapor enters thermal desiccant unit 602 through inlet 612b and flows (in a pathway indicated by heavily dotted and lightly dotted lines) through segmented hygroscopic portions 620a and 620b so as to deposit water in the hygroscopic material before exiting the thermal desiccant unit 602 at fluid outlet 614b.

In the example of FIG. 6, multiple fluid inlets and outlets are depicted, however any desirable number or configuration can be used, for example in association with any desirable valving or fluid routing devices to manage flow between process and working fluid. To minimize complexity, maintenance, leakage and/or cost, fewer or simplified fans, blowers, actuators and other fluidic routing devices can be employed.

Figure 7:
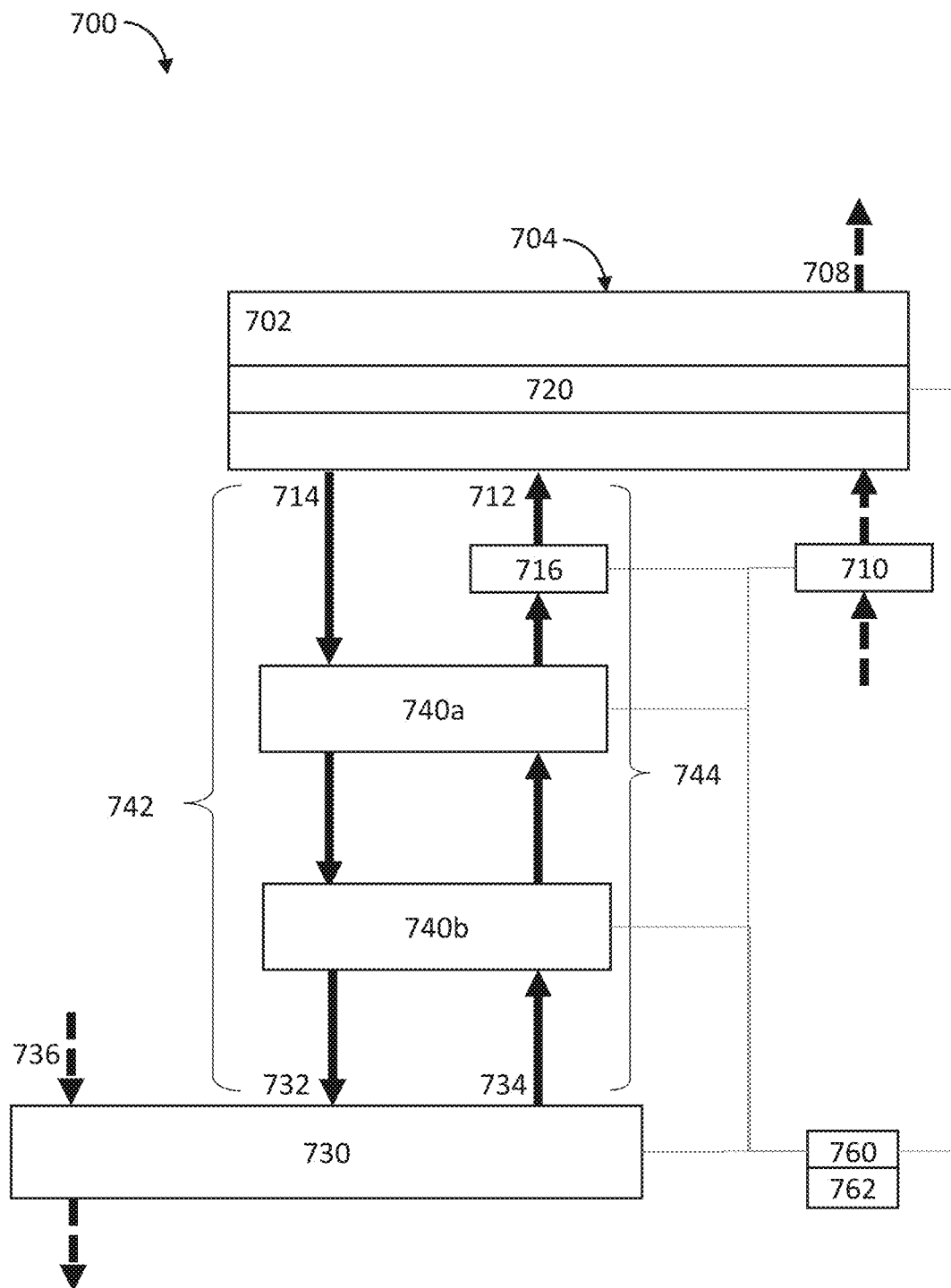
FIG. 7 depicts a water generation system including multiple thermal desiccant units, in accordance with various embodiments.

In some implementations, a water generation system can comprise a plurality of enthalpy exchange units operatively coupled between a thermal desiccant unit and a condenser. As depicted in FIG. 7, water generation system 700 may comprise enthalpy exchange unit 740a and enthalpy exchange unit 740b between thermal desiccant unit 702 and condenser 730. Enthalpy exchange unit 740a transfers enthalpy between the working fluid directly input and output from the thermal desiccant unit 702. Enthalpy exchange unit 740b transfers enthalpy between the working fluid directly input and output from the condenser 730.

Each enthalpy exchange unit in a water generation system can have different enthalpy exchange characteristics resulting in a difference in an amount of sensible and/or latent heat transferred between working fluid flow segments. For example, enthalpy exchange unit 740a and enthalpy exchange unit 740b can comprise different hygroscopic materials. In another example, the enthalpy exchange unit 740a can transfer a greater amount of sensible heat than the enthalpy exchange unit 740b. In another example, the enthalpy exchange unit 740b transfers a greater amount of latent heat than the enthalpy exchange unit 740a. In an additional example, enthalpy exchange unit 740*a* can be configured to have a higher rate of water vapor adsorption and desorption, whereas enthalpy exchange unit 740*b* can be configured to have a lower rate of water vapor adsorption and desorption.

Figure 8:
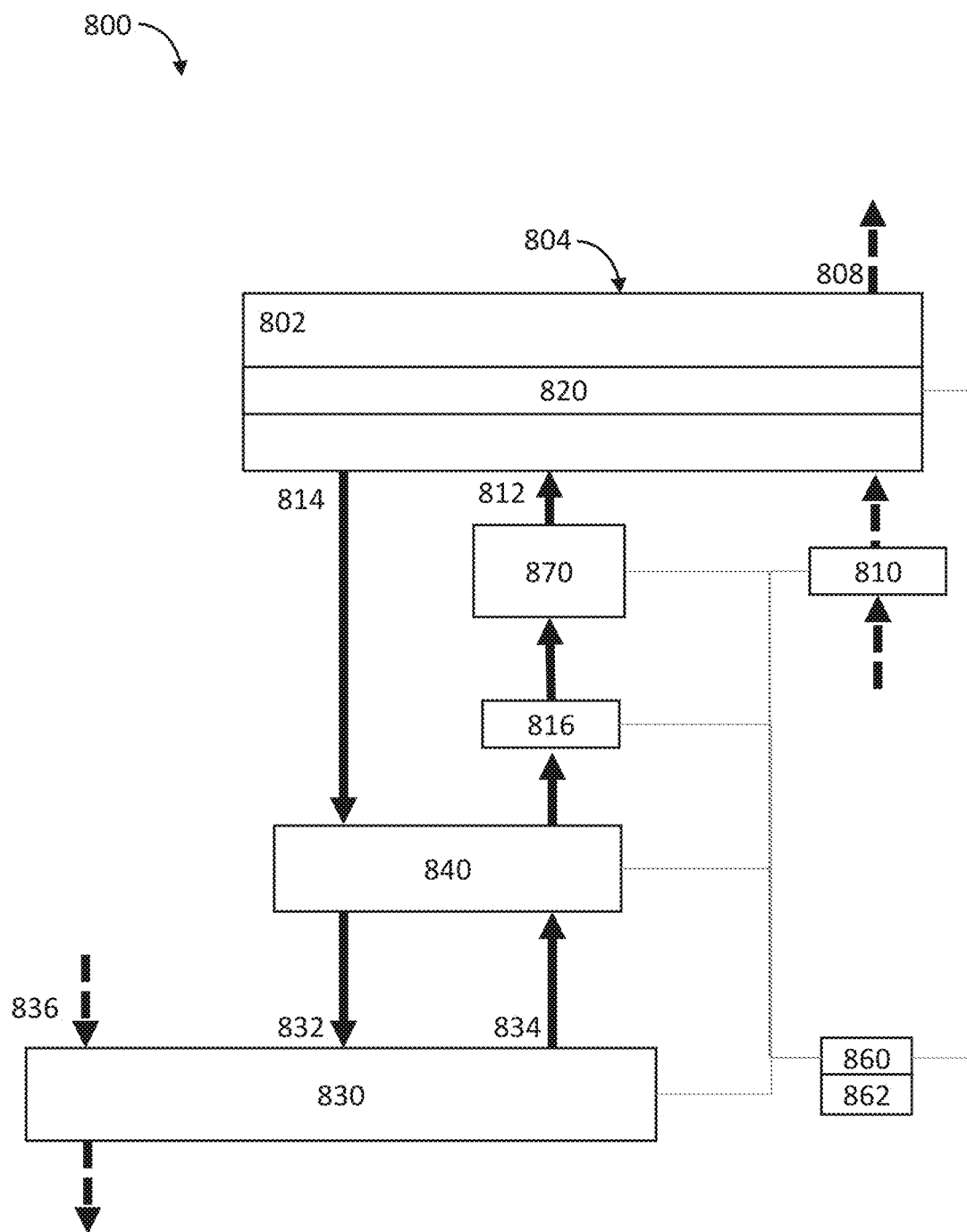
FIG. 8 depicts a water generation system including an auxiliary or batch desiccant unit, in accordance with various embodiments.

FIG. 8 depicts a water generation system 800 comprising a thermal desiccant unit 802, a condenser 830 and an enthalpy exchange unit 840. System 800 may further comprise an auxiliary or batch desiccant unit 870 comprising a batch hygroscopic material. The batch hygroscopic material can capture water vapor from the working fluid in advance of thermal desiccant unit 802. The batch desiccant unit 870 can collect residual water vapor from the working fluid that was not condensed by the condenser 830 earlier in the cycle. The hygroscopic material of the batch desiccant unit 870 may saturate (i.e. discontinue collecting water vapor) after a portion of the release time; however, as conditions of the working fluid change (e.g., if the temperature of working fluid between condenser outlet 834 and thermal desiccant unit inlet 812 is too hot or the moisture content too dry for saturation), the batch desiccant could release water vapor back into the recirculating working fluid.

In one embodiment, the hygroscopic material 820 of the thermal desiccant unit 802 is different from the hygroscopic material of the batch desiccant unit 870. For example, the hygroscopic materials of the thermal desiccant unit and the batch desiccant unit can vary based on water uptake mass percentage, water uptake and release rates (in some cases as a function of exposed humidity and temperature), water uptake and release rates as a function of air flow rates, and so on.

As depicted in the example of FIG. 8, the batch desiccant unit can be provided to capture water vapor in the working fluid pathway between the condenser and the thermal desiccant unit. This may be advantageous in that the batch desiccant unit can modulate the water vapor content of the working fluid during the release time by adsorbing excess water vapor released from the thermal desiccant unit. Furthermore, the batch desiccant unit can modulate the water vapor content of the working fluid during the release time by desorbing water vapor at conditions when the thermal desiccant is minimally or not releasing water vapor to the working fluid. In this way, the batch desiccant unit can be a supplemental source of water to the system.

Figure 9:
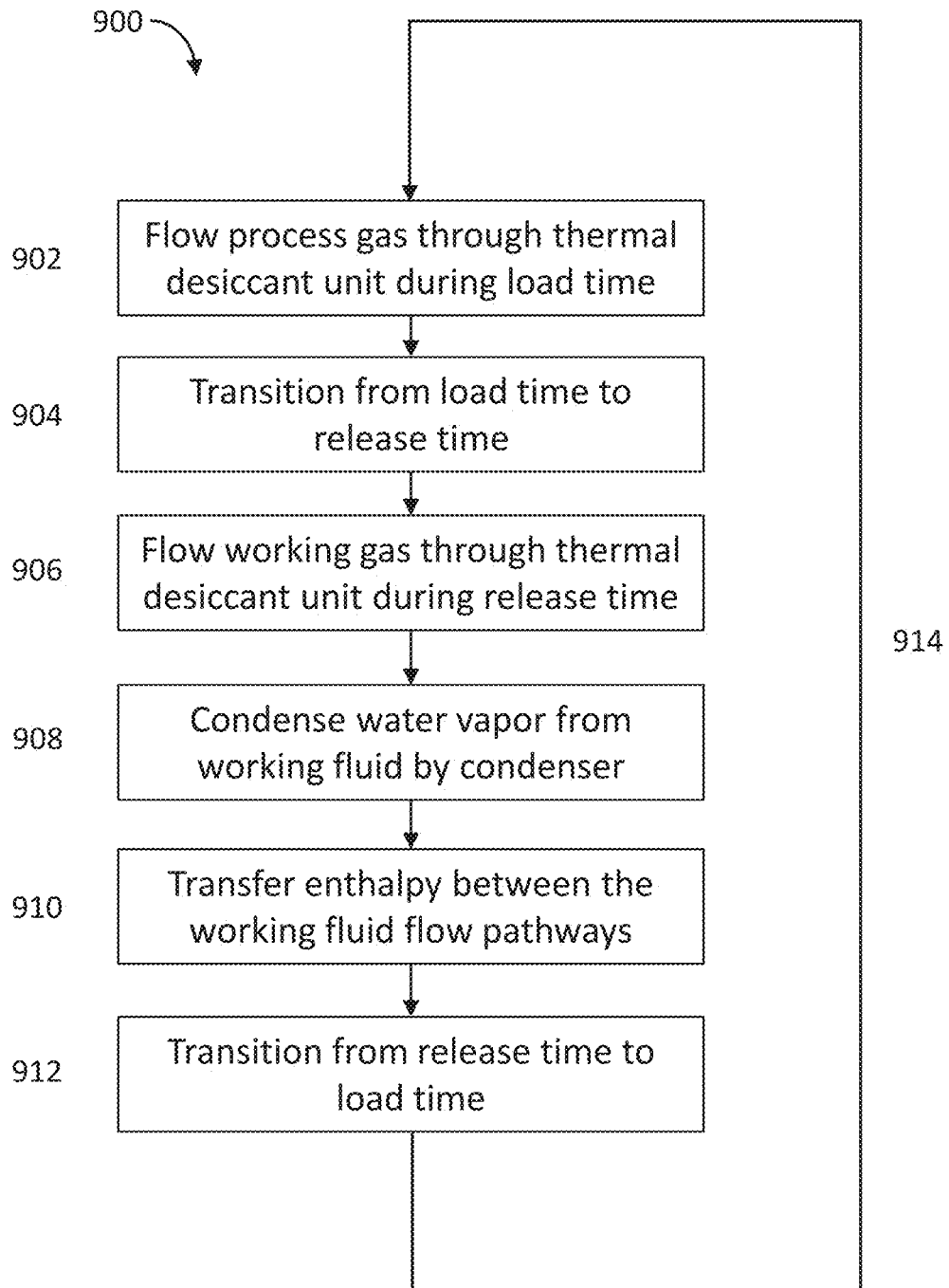
FIG. 9 depicts a flowchart of a method of operating a water generation system, in accordance with various embodiments.

The present disclosure further provides methods or processes for generating water with a thermal desiccant unit. Referring to FIG. 9, a flowchart of a method of operating a water generation system is shown in accordance with an embodiment of the present disclosure. At operation 902, a process gas may flow through a thermal desiccant unit comprising a porous hygroscopic material, for example during a load time (e.g. nighttime). At operation 902, the porous hygroscopic material in the thermal desiccant unit may capture water vapor from the process gas. At 904, the method can include transitioning from the load time to a release time (e.g. daytime). In on example, the method comprises monitoring ambient conditions (e.g. solar flux, relative humidity, temperature) and/or actual or estimated amount of water in the water generation system (e.g. loading equivalent relative humidity of the hygroscopic material in the thermal desiccant unit) and, based on the monitored or estimated data, transitioning from the load time to the release time.

As depicted in flowchart 900, the method may comprise flowing a working fluid through the thermal desiccant unit comprising the porous hygroscopic material during the release time at operation 906. At operation 906, the working fluid may accumulate both heat and water vapor while flowing through the thermal desiccant unit. At operation 908, the method may include condensing, by a condenser, water vapor from the working fluid into liquid water during the release time.

At operation 910, enthalpy may be transferred or exchanged, by an enthalpy exchange unit, between working fluid pathways during the release time. At operation 910, the rate of enthalpy exchange can be varied based on one or more of: a user selection, data received from one or more sensors (e.g. data relating to one or more ambient conditions, data relating to working fluid water content, water content in thermal desiccant unit, etc.), forecast conditions, programmatic control, an algorithm, and/or by any other desirable bases. In on example, the method comprises continuous monitoring of ambient conditions (e.g. solar flux, relative humidity, temperature) and/or actual or estimated amount of water in the working fluid or thermal desiccant unit and, based on the monitored or estimated data.

At operation 912, the method may further comprise transitioning from the load time to the release time. At operation 914, the process can by repeated or cycled. Transitioning between the load time and the release time can be based on one or more of: a user selection, data received from one or more sensors (e.g. data relating to one or more ambient conditions, data relating to working fluid water content, water content in thermal desiccant unit, etc.), forecast conditions, programmatic control, an algorithm, and/or by any other desirable bases. In on example, the method comprises continuous monitoring of ambient conditions (e.g. solar flux, relative humidity, temperature) and/or actual or estimated amount of water in the working fluid or thermal desiccant unit and, based on the monitored or estimated data, transitioning from the load time to the release time.

Figure 10:
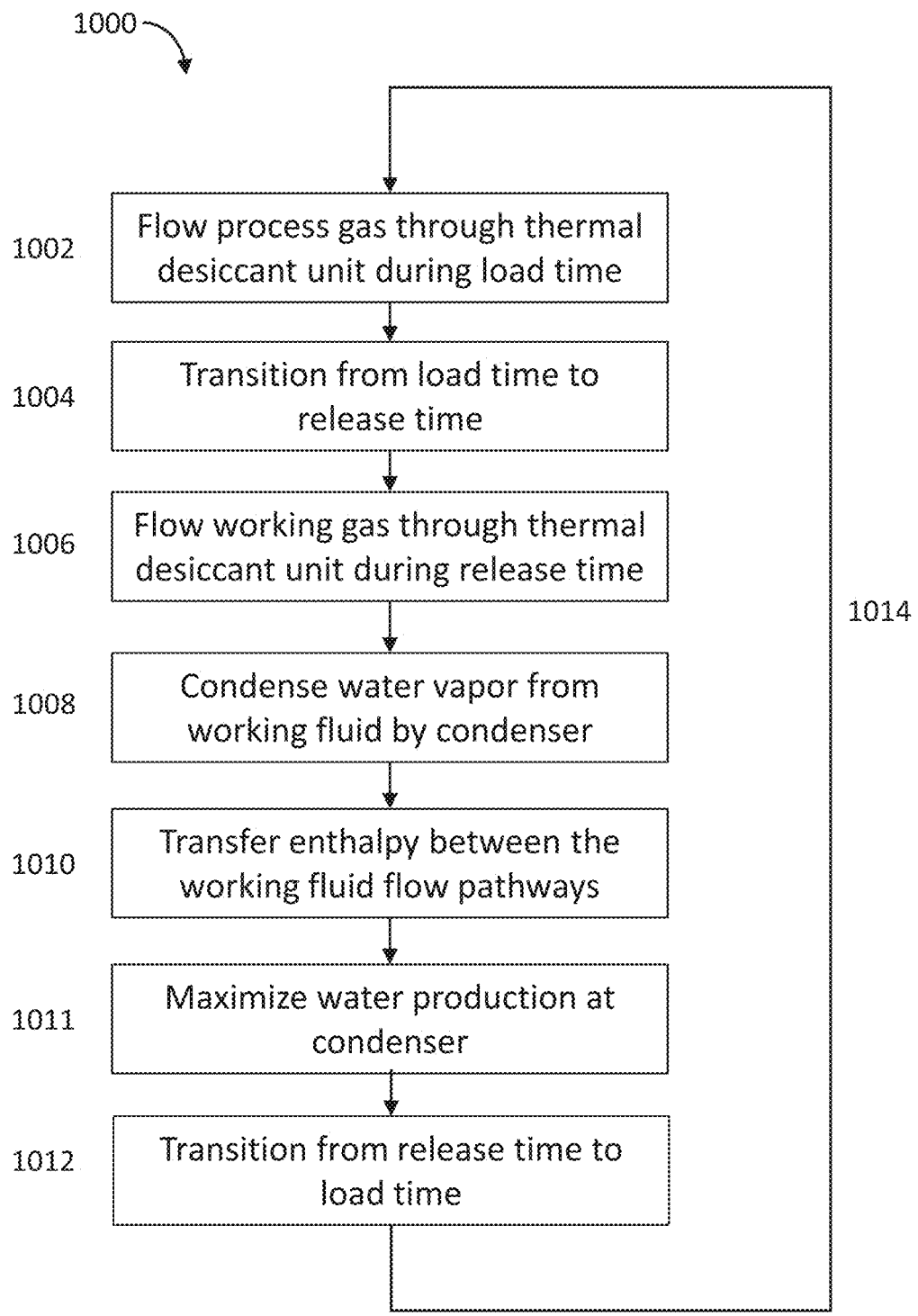
FIG. 10 depicts a flowchart of a method of operating a water generation system, in accordance with various embodiments.
Figure 11:
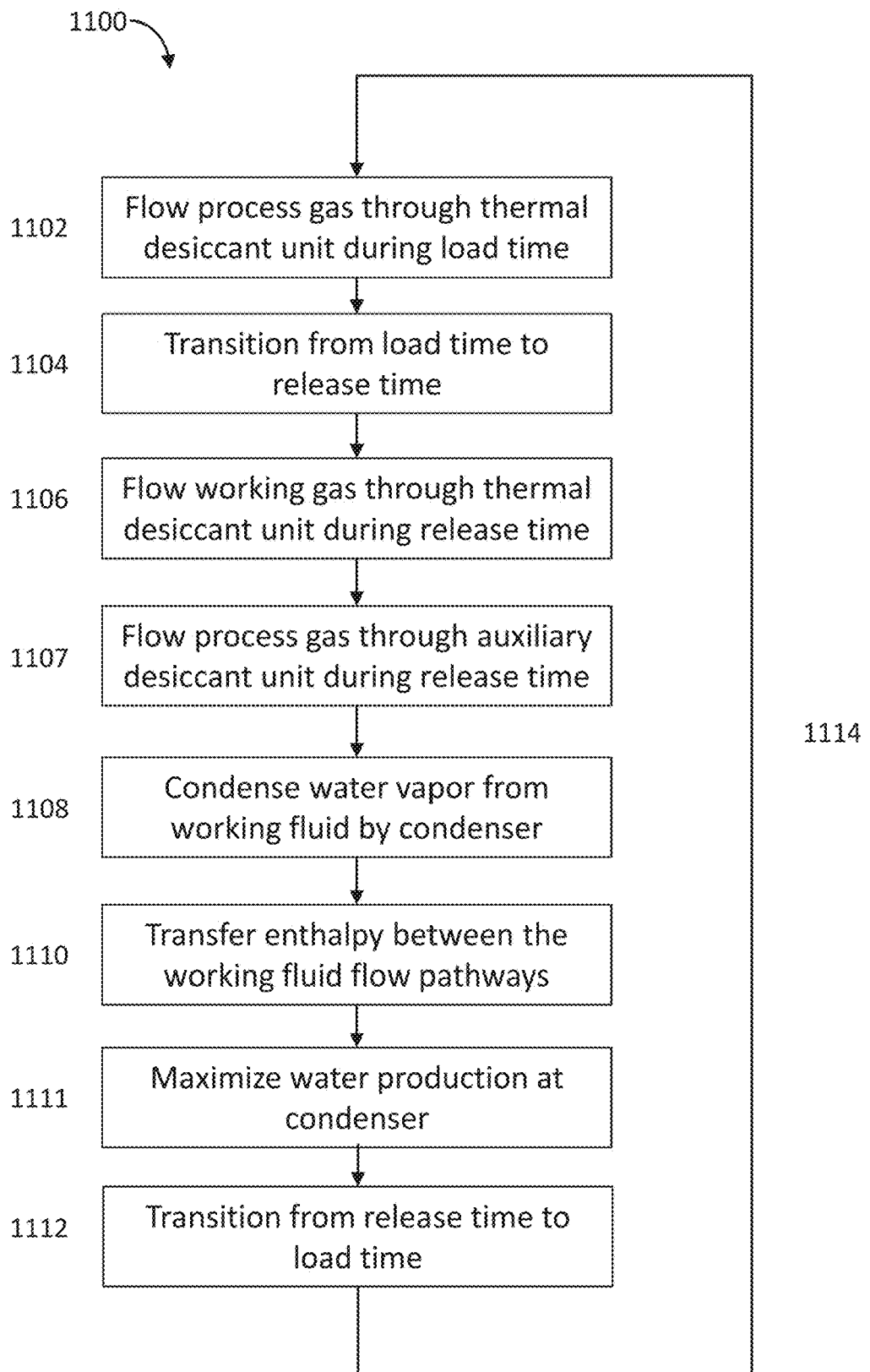
FIG. 11 depicts a flowchart of a method of operating a water generation system comprising an auxiliary desiccant unit, in accordance with various embodiments.

FIGS. 9-11 illustrate various methods of operating water generation systems comprising a thermal desiccant unit. Unless otherwise specified below, the numerical indicators used to refer to operations in FIGS. 10-11 are similar to those used to refer to operations or features in FIG. 9 above, except that the index has been incremented by 100.

Referring to FIG. 10, a flowchart 1000 of a method of operating a water generation system is shown in accordance with an embodiment of the present disclosure. At operation 1002, a process gas may flow through a thermal desiccant unit comprising a porous hygroscopic material during a load time. At operation 1004, the system may transition to a release time and a working fluid flows through the thermal desiccant unit at 1006. At operation 1008, water vapor may be condensed from the working fluid into liquid water and at operation 1010, enthalpy may be exchanged between working fluid pathways during the release time.

At operation 1011 of flowchart 1000, the method may include maximizing the liquid water production of the condenser (e.g. actual or estimated water production rate, total amount of water produced during a release time, etc.) by varying an exchange rate of the first enthalpy exchange unit, the flow rate of the working fluid, the flow rate of the process gas, or a combination thereof. For example, a controller can vary the enthalpy exchange rate and/or the flow rate of the working fluid, based on an ambient solar flux, an ambient temperature, an ambient relative humidity, a temperature of the working fluid, a relative humidity of the working fluid, an amount of water present in the hygroscopic material in the thermal desiccant unit, an elapsed time, a user selection, a predetermined program or a combination thereof. As another example, a controller can vary the enthalpy exchange rate and/or the flow rate of the working fluid to maintain an increase of the net flux of water vapor toward the condenser. At operation 1012, the method may further comprise transitioning from the load time and the release time. At operation 1014, the process can by repeated or cycled.

In systems comprising an auxiliary desiccant unit with an adsorption zone and a desorption zone, the method can further comprise moving a hygroscopic material in the auxiliary desiccant unit between an adsorption zone and a desorption zone. Referring to FIG. 11, flowchart 1100 depicts a method of operating a water generation system comprising an auxiliary desiccant unit in accordance with various embodiments. At operation 1102, a process gas may flow through a thermal desiccant unit comprising a porous hygroscopic material during a load time. At operation 1104, the system may transition to a release time and a working fluid flows through the thermal desiccant unit at operation 1106.

As depicted in the flowchart 1100, the method may include flowing a process gas through a hygroscopic material in the adsorption zone of the auxiliary desiccant unit during the release time at operation 1107. In the adsorption zone, the auxiliary hygroscopic material may capture water vapor from the process gas and in the desorption zone, the auxiliary hygroscopic material may release water to the working fluid flow. At 1108, water vapor may be condensed from the working fluid into liquid water and at operation 1110, enthalpy may be exchanged between working fluid pathways during the release time.

At operation 1111, the method may include maximizing the liquid water production of the condenser (e.g. actual or estimated water production rate, total amount of water produced during a release time, etc.) by varying an exchange rate of the first enthalpy exchange unit, the flow rate of the working fluid, the rate of movement of the auxiliary hygroscopic material between the adsorption zone and the desorption zone or a combination thereof. For example, a controller can vary the enthalpy exchange rate, the flow rate of the working fluid and/or the rate of movement of the auxiliary hygroscopic material between the adsorption zone and the desorption zone based on an ambient solar flux, an ambient temperature, an ambient relative humidity, a temperature of the working fluid, a relative humidity of the working fluid, amount of water present in the hygroscopic material in the thermal desiccant unit, amount of water present in the hygroscopic material in the auxiliary desiccant unit, an elapsed time, a user selection, a predetermined program or a combination thereof. At operation 1112, the system may transition from the load time to the release time. At operation 1114, the process can by repeated or cycled.

Figure 12A:
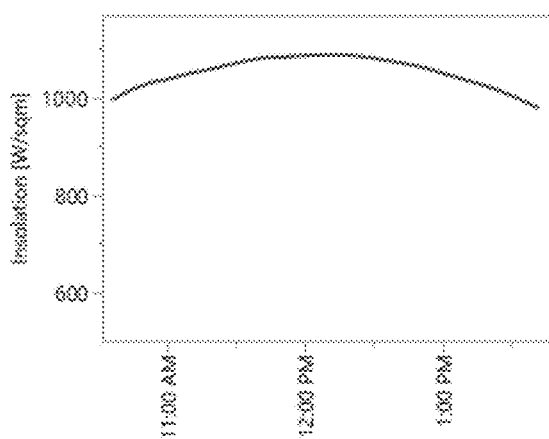
FIGS. 12A-12F depict data plots relating to operation of a thermal desiccant unit, in accordance with various embodiments.
Figure 12B:
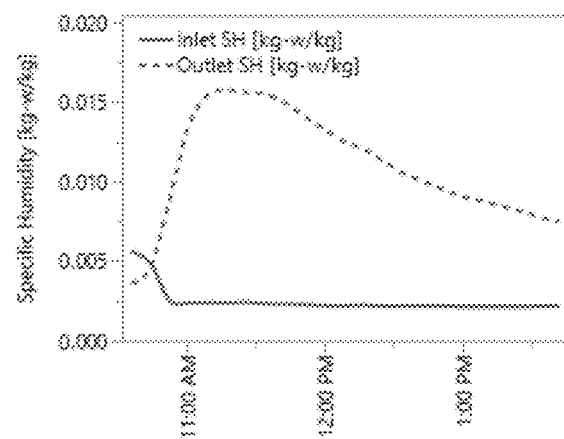
Figure 12C:
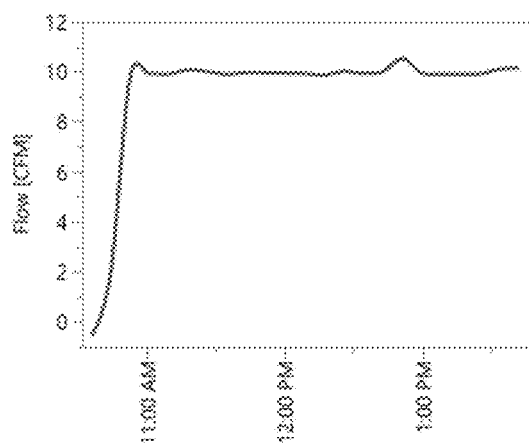
Figure 12D:
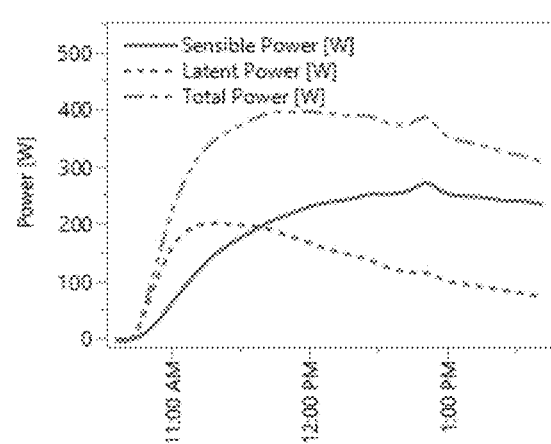
Figure 12E:
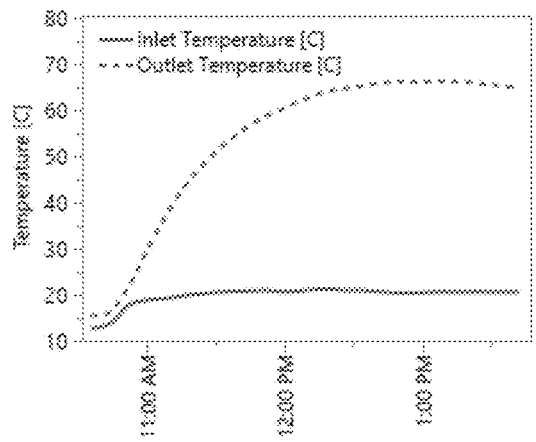
Figure 12F:
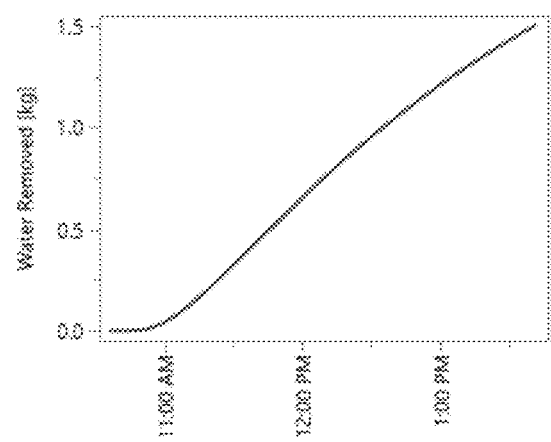

FIGS. 12A-12F shows plotted data versus time for a thermal desiccant unit during a release cycle including solar insolation (FIG. 12A); specific humidity (FIG. 12B); working fluid flow rate through thermal desiccant unit (FIG. 12C); thermal desiccant unit power by total power, sensible power and latent power (FIG. 12D); inlet temperature and outlet temperature (FIG. 12E); and water removed or generated by the thermal desiccant unit (FIG. 12F). The thermal desiccant unit was loaded with water from a process gas during a previous load cycle (e.g. to an equivalent of 83% RH). At time 11:00h, the loaded thermal desiccant unit was exposed to solar thermal radiation and a working fluid flow. The total power (sum of sensible and latent heat) extracted from the thermal desiccant unit is shown in FIG. 12D and the amount of water output from the thermal desiccant unit is shown in FIG. 12F, which approaches 2 liters of water.

Figure 14:
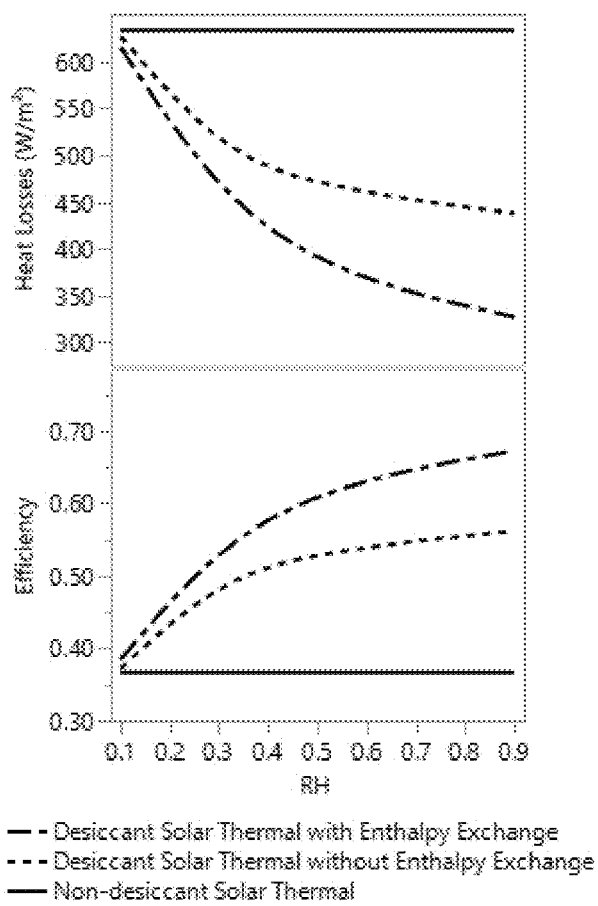
FIG. 14 depicts data plots comparing heat loss and total system efficiency as between a non-desiccant solar thermal unit, a desiccant solar thermal unit lacking an enthalpy exchange unit, and a desiccant solar thermal unit having an enthalpy exchange unit.

FIG. 14 shows plotted data comparing the system efficiency of various water generation systems, and comparing heat losses of various water generation systems, each as a function of relative humidity. The plots compare a system known in the prior art (i.e., a non-desiccant solar thermal unit, which lacks a desiccant or porous hygroscopic material disposed in a thermal desiccant unit), with two embodiments of the present disclosure, each of which include a porous hygroscopic material in the thermal desiccant unit, and one of which further comprises an enthalpy exchange unit, each in accordance with various embodiments. System efficiency and heat loss were measured from when the system was loaded to a designated relative humidity and subjected to a solar irradiance of 1000 Whr/m$^2$ over a period of time at 25° C. FIG. 14 shows that heat losses in a non-desiccant solar thermal unit are higher than disclosed embodiments comprising a thermal desiccant unit and/or enthalpy exchange unit. In contrast, embodiments comprising a thermal desiccant unit as described herein have lower heat loss because evaporative work by the system captures latent energy as water production. Embodiments comprising an enthalpy exchange unit may increase the temperature and/or lower the moisture content of working fluid that enters the thermal desiccant unit, thereby increasing the efficiency of the thermal desiccant unit.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus-function or step-plus-function limitations, unless such a limitation is explicitly recited in a given claim using the phrase(s) "means for" or "step for," respectively. The term "substantially," as used herein, is intended to encompass minor deviations rather define an exact value.

What is claimed is:

1. A system comprising:
    a thermal unit to receive solar radiation during daylight hours and convert received solar radiation into heat;
    a hygroscopic material to:
        adsorb water vapor from ambient air, and
        receive heat from the thermal unit to desorb water vapor therefrom;
    a condenser for condensing water vapor desorbed from the hygroscopic material;

an energy storage unit to store energy collected during daylight hours for utilization of stored energy during off-solar hours; and an auxiliary hygroscopic material independent from the thermal unit.

2. The system of claim 1, wherein the hygroscopic material is a liquid, solid, or a combination thereof.

3. The system of claim 1, further comprising an enthalpy exchange unit to transfer sensible heat, latent heat, or both sensible and latent heat between a plurality of flow segments of a working gas flow path.

4. The system of claim 3, wherein the enthalpy exchange unit is configured to recover sensible energy via heat transfer from a working fluid in a flow segment having a higher temperature value to the working fluid in a flow segment having a lower temperature value.

5. The system of claim 3, wherein the enthalpy exchange unit is configured to recover latent energy via water vapor transfer from a working fluid in a flow segment having a higher water vapor pressure to the working fluid in a flow segment flow having a lower water vapor pressure.

6. The system of claim 1, wherein the system further comprises a photovoltaic panel;

and, wherein heat from the photovoltaic panel heats the hygroscopic material during daylight hours.

7. The system of claim 1, wherein the energy storage unit comprises a battery for storage of energy collected during daylight hours via a photovoltaic panel.

8. The system of claim 1, further comprising a controller configured to control production of water by adjusting: an exchange rate of the enthalpy exchange unit, a flow rate of a working fluid, a flow rate of a ambient air into the system, a flow rate of cooling airflow across the condenser, or a combination thereof.

9. The system of claim 8, wherein the controller adjusts a working fluid flow rate based on: an ambient solar flux, an ambient temperature, an ambient relative humidity, a temperature of a working fluid, a relative humidity of a working fluid, an amount of water present in the hygroscopic material, an elapsed time, a user selection, or a predetermined program.

10. A water generation system comprising:
a hygroscopic material configured to absorb thermal energy generated during daylight hours;
a working fluid to accumulate heat and water vapor from the hygroscopic material upon absorption of thermal energy;
a condenser for condensing water vapor from the working fluid;
an energy storage unit to store energy collected during daylight hours; and
a controller configured to control a water production rate via utilization of stored energy during off-solar hours, wherein the controller is configured to increase water generation by the system in response to accumulation by the working fluid of at least one of heat or water vapor from the hygroscopic material.

11. The system of claim 10, wherein the controller is configured to control the water production rate by adjusting:

an exchange rate of an enthalpy exchange unit;
a flow rate of the working fluid;
a flow rate of a process gas;
a flow rate of cooling airflow to the condenser; or
a combination thereof.

12. The system of claim 10, wherein the controller is configured to control the water production rate based on: an ambient solar flux, an ambient temperature, an ambient relative humidity, a temperature of the working fluid, a relative humidity of the working fluid, a pressure of the working fluid, a water vapor partial pressure of the working fluid, a condenser discharge temperature, a water production volume, a water usage rate, a water quality, an amount of water present in the hygroscopic material, an elapsed time, a user selection, a predetermined program, or, a combination thereof.

13. The system of claim 10, wherein the controller is configured to transition the system between a load time and a release time based on: a user selection, an ambient condition, a water content of the working fluid, a water content of the hygroscopic material, a forecast condition, or a combination thereof.

14. The system of claim 10, further comprising a fan configured to adjust: a flow rate of the working fluid, a flow rate of a process gas to capture water vapor therefrom by the hygroscopic material; a flow rate of a cooling flow across the condenser so as to remove heat from the condenser; or a combination thereof.

15. A method of generating water from air using solar energy comprising:
adsorbing, by a hygroscopic material, water vapor from ambient air;
receiving solar radiation during daylight hours;
converting received solar radiation into heat;
heating the hygroscopic material to desorb water vapor therefrom;
condensing water vapor desorbed from the hygroscopic material;
storing energy collected during daylight hours;
utilizing stored energy during off-solar hours; and
increasing water generation by the system in response to accumulation by a working fluid of at least one of heat or water vapor from the hygroscopic material.

16. The method of claim 15, further comprising controlling, via a controller, production of water by adjusting: an exchange rate of the enthalpy exchange unit, a flow rate of a working fluid, a flow rate of ambient air into the system, a flow rate of cooling airflow across the condenser, or a combination thereof.

17. The method of claim 15, further comprising transferring, via an enthalpy exchange unit, sensible heat, latent heat, or both sensible and latent heat between flow segments of a working fluid flow path.

18. The method of claim 15, further comprising heating the hygroscopic material via the photovoltaic panel during daylight hours.

* * * * *